(12) United States Patent
Iqtidar et al.

(10) Patent No.: US 10,717,187 B2
(45) Date of Patent: Jul. 21, 2020

(54) DESKTOP ROBOTIC ARM WITH INTERCHANGEABLE END EFFECTORS

(71) Applicant: AM Networks LLC, Round Rock, TX (US)

(72) Inventors: Zaib Iqtidar, Round Rock, TX (US); Shahzada Azam, Round Rock, TX (US); Michael Morton, Austin, TX (US); Ali Ghani Syed, Round Rock, TX (US)

(73) Assignee: AM Networks LLC, Round Rock, TX (US)

( * ) Notice: Subject to any disclaimer, the term of this patent is extended or adjusted under 35 U.S.C. 154(b) by 366 days.

(21) Appl. No.: 15/421,903

(22) Filed: Feb. 1, 2017

(65) Prior Publication Data

US 2017/0217013 A1 Aug. 3, 2017

Related U.S. Application Data

(60) Provisional application No. 62/289,481, filed on Feb. 1, 2016.

(51) Int. Cl.
*B25J 9/08* (2006.01)
*B25J 9/04* (2006.01)
(Continued)

(52) U.S. Cl.
CPC ............ *B25J 9/08* (2013.01); *B25J 5/007* (2013.01); *B25J 5/02* (2013.01); *B25J 9/042* (2013.01);
(Continued)

(58) Field of Classification Search
CPC ..... B25J 5/005; B25J 5/007; B25J 5/02; B25J 9/023; B25J 9/041; B25J 9/042;
(Continued)

(56) References Cited

U.S. PATENT DOCUMENTS

D206,094 S 10/1966 Hill
D293,324 S 12/1987 Gotou et al.
(Continued)

FOREIGN PATENT DOCUMENTS

WO 2004/096502 11/2004
WO 2009/086495 7/2009
(Continued)

OTHER PUBLICATIONS

PCT International Search Report and Written Opinion for corresponding PCT Application No. PCT/US17/16031, dated Jun. 6, 2017.

(Continued)

*Primary Examiner* — Saul Rodriguez
*Assistant Examiner* — Brendan P Tighe
(74) *Attorney, Agent, or Firm* — Moore Intellectual Property Law, PLLC

(57) ABSTRACT

A device comprising a tower covered by a shell, the tower having a base with a first axis of movement around a first joint, a first arm connected to the tower via a second joint along a second axis of movement, a second arm connected to the first arm at a proximal end of the second arm via a third joint defining a third axis of movement, the second arm having an end effector interface configured to hold a variety of end effectors usable for different applications, the end effectors being exchangeable allowing the device to perform digital fabrication and desktop manufacturing, an autolevelling function configured to sense a height of a work surface, and a training function allowing a user to teach either arm to perform or repeat specific actions and/or collaborate with the other arm to achieve a common assembly or fabrication task.

20 Claims, 30 Drawing Sheets

(51) Int. Cl.
*B25J 5/00* (2006.01)
*B25J 5/02* (2006.01)
*B25J 11/00* (2006.01)
*B25J 15/06* (2006.01)

(52) U.S. Cl.
CPC ......... *B25J 11/005* (2013.01); *B25J 15/0616* (2013.01)

(58) Field of Classification Search
CPC ... B25J 9/08; B25J 9/108; B25J 11/005; B25J 11/0616; B29C 64/118; B29C 64/20; B33Y 30/00
See application file for complete search history.

(56) References Cited

U.S. PATENT DOCUMENTS

| | | | |
|---|---|---|---|
| D298,834 S | 12/1988 | Jones | |
| 4,863,133 A | 9/1989 | Bonnell | |
| 5,410,944 A | 5/1995 | Cushman | |
| 5,570,992 A * | 11/1996 | Lemelson | B23Q 11/10 414/744.3 |
| 6,246,200 B1 | 6/2001 | Blumenkranz | |
| 6,318,951 B1 * | 11/2001 | Schmidt | B25J 5/02 414/744.5 |
| 7,578,649 B2 | 8/2009 | Caveney et al. | |
| D715,441 S | 10/2014 | Li et al. | |
| D715,940 S | 10/2014 | Li et al. | |
| D715,941 S | 10/2014 | Li et al. | |
| D767,139 S | 9/2016 | Liu et al. | |
| D767,765 S | 9/2016 | Lin et al. | |
| 2003/0165378 A1 * | 9/2003 | Lavitsky | B25J 5/007 414/744.5 |
| 2008/0213077 A1 | 9/2008 | Tanaka et al. | |
| 2009/0024142 A1 * | 1/2009 | Ruiz Morales | A61B 34/35 606/130 |
| 2010/0031088 A1 | 2/2010 | Nakayama | |
| 2010/0148021 A1 | 6/2010 | Fadler et al. | |
| 2010/0163694 A1 | 7/2010 | Fadler et al. | |
| 2010/0204713 A1 * | 8/2010 | Ruiz Morales | A61B 34/30 606/130 |
| 2010/0290886 A1 | 11/2010 | Hashimoto et al. | |
| 2012/0215358 A1 | 8/2012 | Gettings et al. | |
| 2013/0313382 A1 | 11/2013 | Jakubczak et al. | |
| 2014/0210224 A1 | 7/2014 | Hashimoto et al. | |
| 2014/0251056 A1 | 9/2014 | Preuss | |
| 2015/0127146 A1 * | 5/2015 | Carlson | B25J 9/1617 700/245 |
| 2015/0158185 A1 | 6/2015 | Hsieh | |
| 2015/0366433 A1 | 12/2015 | Atarot et al. | |
| 2015/0375390 A1 * | 12/2015 | Becroft | B25J 9/0018 427/427.2 |
| 2016/0031088 A1 | 2/2016 | Suzuki | |
| 2016/0100897 A1 | 4/2016 | Avalos et al. | |
| 2016/0107317 A1 | 4/2016 | Hashimoto et al. | |
| 2016/0318179 A1 * | 11/2016 | Komatsu | B25J 9/0018 |
| 2017/0217013 A1 | 8/2017 | Iqtidar et al. | |
| 2017/0225336 A1 | 8/2017 | Deyle et al. | |
| 2017/0340408 A1 | 11/2017 | Oginski et al. | |
| 2018/0213160 A1 * | 7/2018 | Tomiyama | G06Q 10/087 |

FOREIGN PATENT DOCUMENTS

| | | |
|---|---|---|
| WO | 2017136429 A1 | 8/2017 |
| WO | 2017136429 A4 | 8/2017 |

OTHER PUBLICATIONS

Simon, Matt, "Embodied Intelligence Wants to Teach Robots With Virtual Reality," https://www.wired.com, Nov. 7, 2017, 3 pages.

* cited by examiner

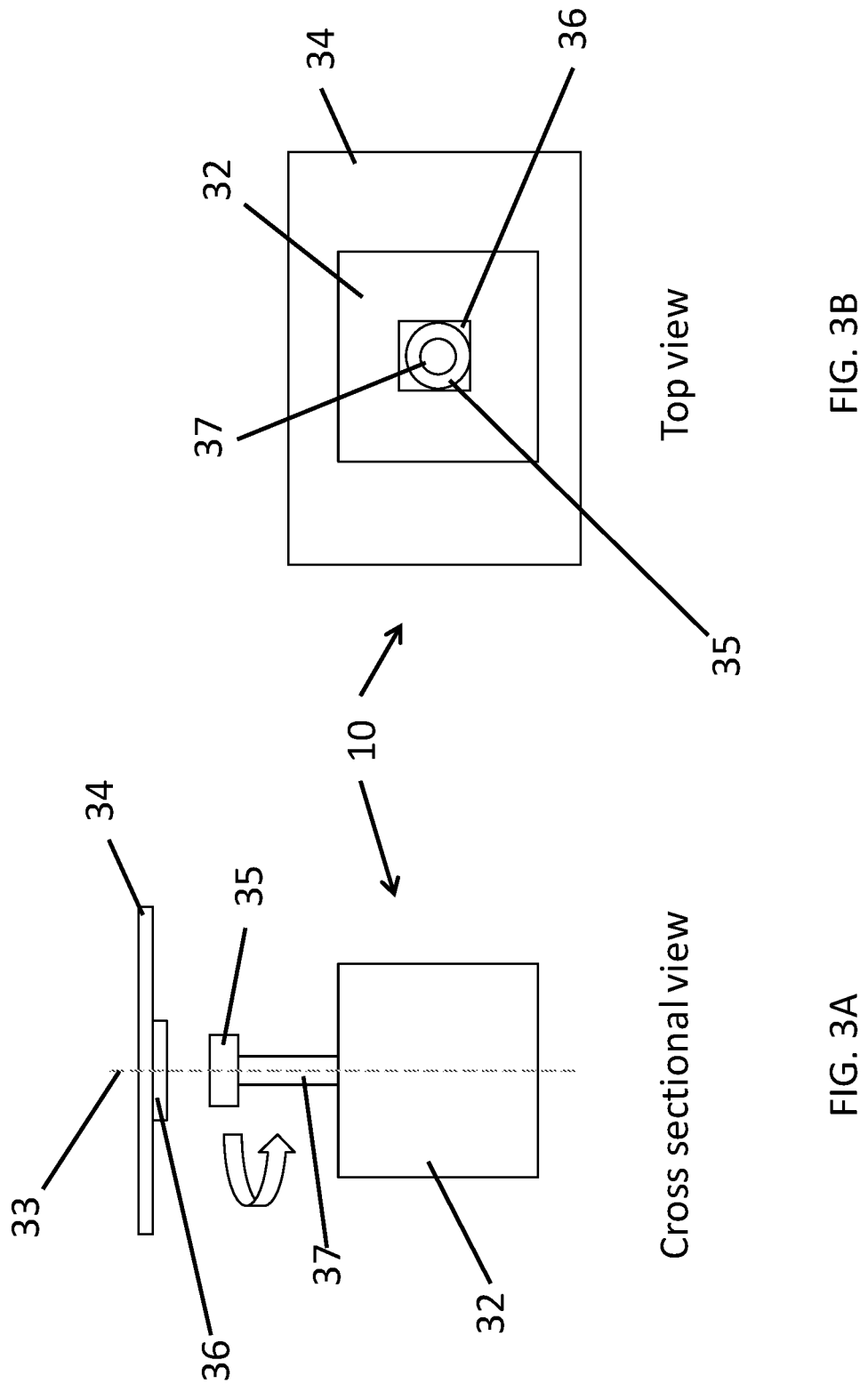

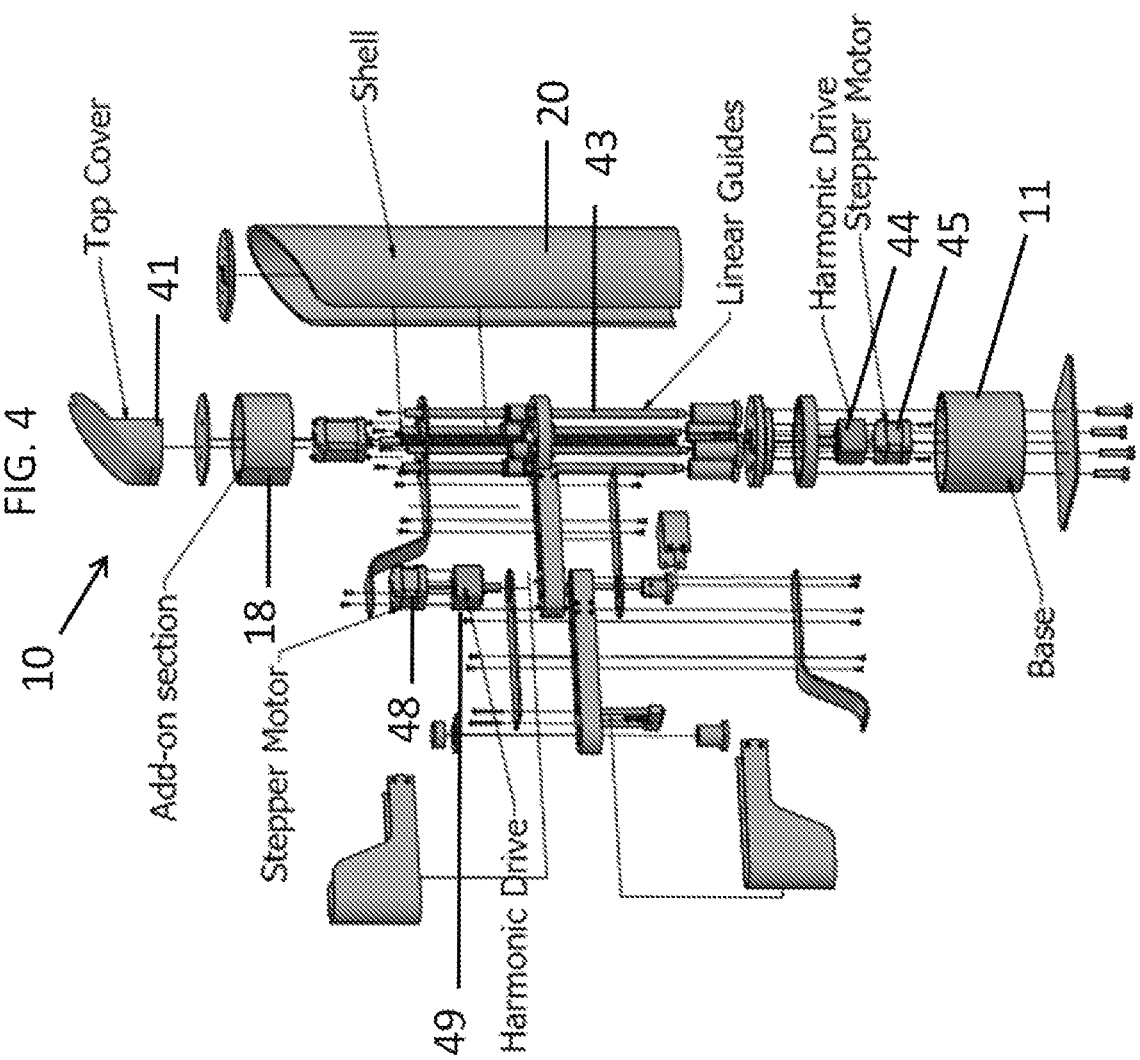

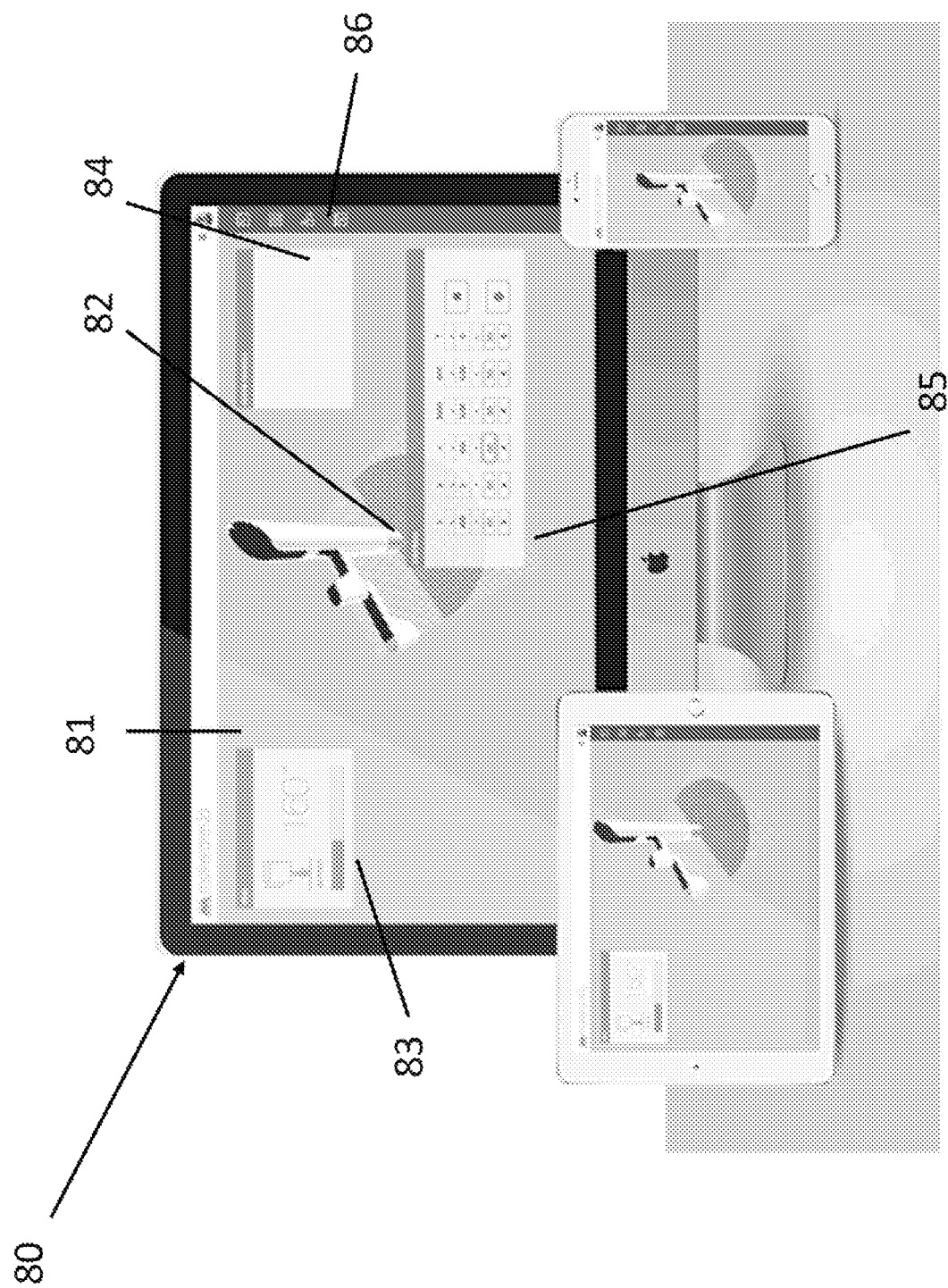

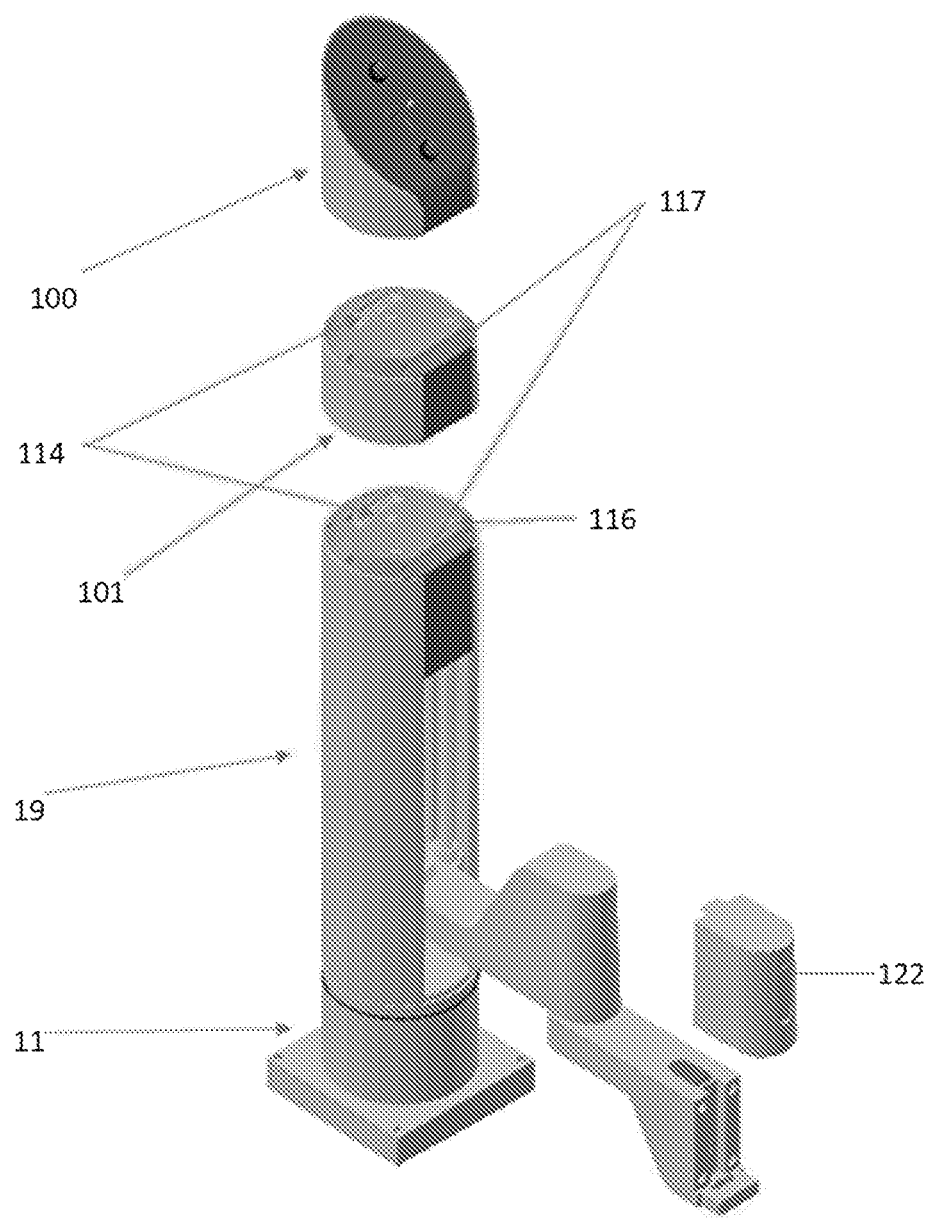

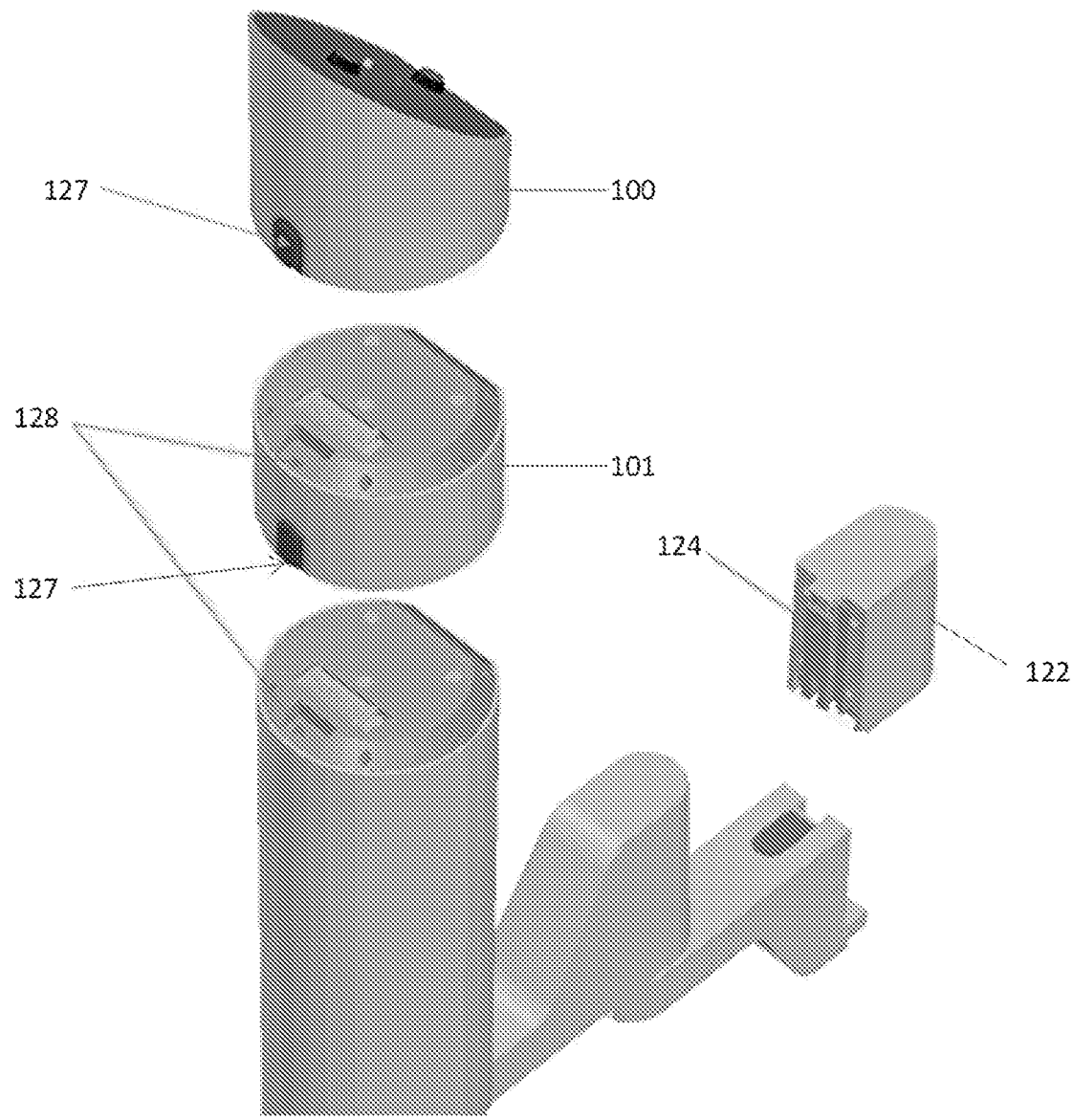

DESKTOP ROBOTIC ARM WITH INTERCHANGEABLE END EFFECTORS

RELATED APPLICATIONS

This application claims the benefit of and priority to U.S. Provisional Application Ser. No. 62/289,481, filed Feb. 1, 2016, the entirety of which is hereby incorporated herein by reference.

FIELD

The present disclosure is directed to a device, and methods of making or using the device, for digitally fabricating physical objects from data which is usually in the form of CAD models.

BACKGROUND

Digital fabrication is a broad term encompassing many technologies that are used to fabricate physical objects from data, which is usually in the form of computer aided design (CAD) models. This may include traditional rapid prototyping methods such as subtractive manufacturing, of which computer numerical control (CNC) milling is most common and additive methods whereby an object is produced by slicing it into layers and building up each layer at a time. Fused deposition modeling (FDM), Stereolithography Apparatus (SLA) and Selective Laser Sintering (SLS) 3D printing are some examples of additive techniques. Industrial robotic arms have been used for rapid prototyping and sculptured surface cutting, and subtractive manufacturing has been done by 5 axis robotic arms for shaping 3D foam objects with a hot tip. Additive manufacturing techniques have also been successfully implemented with robotic arms, where, for example, a multiple degrees of freedom (DOF) robotic arm has been used for multi-material and multi-functional fabrication processes including 3D printing and CNC milling. This is achieved by using different specialized end effectors for each process. Additive techniques such as direct metal deposition as well as traditional FDM based 3D printing have also been done. There is still a need for devices for digital fabrication that are easy to operate and move to various work surfaces.

SUMMARY

In some embodiments, a device is provided that includes a tower having a base with a first axis of movement around a first joint. A first arm is connected to the tower via a second joint along a second axis of movement, and a second arm is connected to the first arm via a third joint defining a third axis of movement. An end effector interface is located at a distal end of the second arm configured to removably couple to an end effector usable for an application, and the end effector interface is configured to removably couple to any end effector such that the end effectors are exchangeable.

In some embodiments, the device also includes one or more modules positioned on a portion of the tower such that the one or more modules are configured to provide functionality to the device and the end effector. The one or more modules can include a control module that is configured to control the device and the end effector. The control module can include an interface for controlling the device, and the interface can include indicators relating to the status of the device and an interaction mechanism to control the status of the device. The one or more modules can also include an accessory module configured to work with the end effector to facilitate the application of the end effector. The accessory module can include mechanical or electrical components required by the end effector to facilitate the application of the end effector. In some embodiment, the one or more modules include a unified architecture such that the one or more modules can be stacked on a portion of the tower such that the one or more stacked modules are mechanically and electrically connected to one another and the device and the end effector.

In some embodiments, the device can be positioned on a workspace configured to move with the device to expand an effective work area of the device. The device can be configured to be positioned on a mobility platform that is configured to move in any direction and any distance using a controller in communication with the device and along a path required by the device. In some embodiments, the device can also include an autolevelling function configured to sense a height of a work surface. The autolevelling function can comprise a probe located at the distal end of the second arm, with the probe being configured to measure the height of the work surface at a plurality of different points on the work surface, and configured to prepare a digital map of a slope or a contour of the surface. In some embodiments, the first joint is a revolute joint, the second joint is a prismatic joint, and the third joint is a revolute joint. In some embodiments, the device includes a training function allowing a user to teach either first or second arm to perform or repeat specific actions and/or collaborate with the other arm to achieve a common assembly or fabrication task.

In some embodiments, a device is provided that includes a tower having a base with a first axis of movement around a first joint, a first arm connected to the tower via a second joint along a second axis of movement, and a second arm connected to the first arm at a proximal end of the second arm via a third joint defining a third axis of movement. An end effector is removably coupled to the second arm using an end effector interface, and the end effector is configured to perform 3D printing. An accessory module is positioned on a portion of the tower and is configured to connect mechanically and electrically to the tower and the end effector to provide the end effector with functionality to facilitate 3D printing.

In some embodiments, the accessory module is configured to provide a filament to the end effector for use in 3D printing to form the 3D printed object. In some embodiments, the accessory module includes a motor positioned therein to feed the filament into a 3D printer head positioned within the end effector. In some embodiments, the device further includes a control module configured to control the device and the end effector such that the control module comprises an interface for controlling the device. The interface includes indicators relating to the status of the device and an interaction mechanism to control the status of the device.

In some embodiments, a method is provided that includes removably coupling an end effector to sequence of arms connected to a tower via a one or more joint providing one or more axes of movement, with the end effector being configured to perform an application. The method further includes determining functionality required by the end effector to perform the application, and providing one or more accessory modules for removably coupling to the tower to provide the determined functionality to the end effector.

In some embodiments, the method further includes providing a unified electrical and mechanical architecture such that the accessory module, tower, and end effector are electrically and mechanically connected when the end effector and the accessory module are removably coupled to the tower and the sequence of arms. In some embodiments, the method further includes controlling the functionality of the tower and the end effector using a control module removably coupled to the tower and stacked upon the accessory module.

In some embodiments, a device is provided that includes a tower and an arm assembly connected to the tower via a joint. The arm assembly can include one or more arms moveable relative to one another and to the tower. An end effector interface is located at a distal end of the arm assembly and configured to removably couple to an end effector usable for an application. The end effector interface is configured to removably couple to any end effector such that the end effectors are exchangeable.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 3A illustrates a cross sectional view of an embodiment of a device having a collision detection capability in according to some embodiments of the present disclosure;

FIG. 3B illustrates a top view of an embodiment of a device having a collision detection capability in according to some embodiments of the present disclosure;

FIG. 4 is an exploded view of an embodiment of a device of the present disclosure;

FIG. 8 depicts a mockup of a software/user interface (UI) according to some embodiments of the present disclosure;

FIG. 13 is a partially exploded view of a robotic arm having a plurality of modules coupled thereto;

FIG. 14A and FIG. 14B are images of another embodiment of a connection mechanism between the robotic arm of FIG. 12 and an end effector;

Figure 1A:
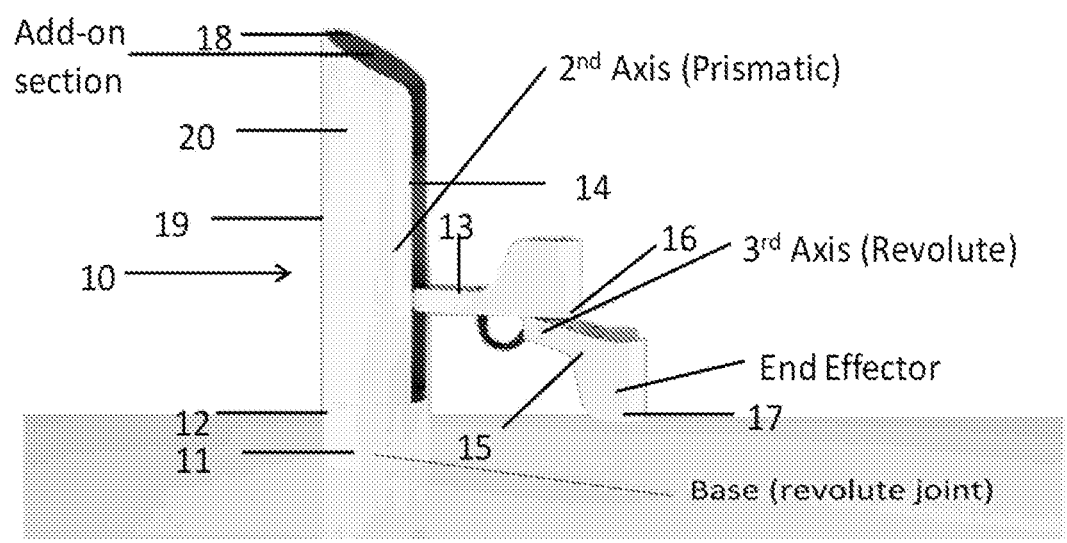
FIG. 1A is an image of an embodiment of a robotic arm according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the disclosure as set forth in the appended claims.

In accordance with the present disclosure, provided herein are devices for digital fabrication comprising interchangeable ends, one or more arms (which may be referred to collectively as the "robotic arms") and a main body or tower. The devices may be used as digital fabrication/rapid prototyping/desktop manufacturing tools, for 3D printing (FDM and SLA), for CNC/printed circuit board (PCB) machining/engraving, for laser engraving/cutting, as electronics pick and place assembly tools (PCBA), and for liquid/glue/solder dispensing. The devices may also be configured as low volume manufacturing tools, as process automation and assembly tools, or as robotics/STEM educational tools.

As used herein, "axis of movement", "axes of movement," "axis of rotation" or "axes of rotation" may be used interchangeably with an "axis" or "axes", and shall refer to movement of parts of the device around or mediated by a joint. A "joint" refers to a connector for one or more parts of the device, such as one or more robotic arms, that confers a rotational or directional movement function to at least one of the parts of the device, such as, for example, a rotational or revolute joint (R) capable of rotational movement within a horizontal plane, or a prismatic joint (P) capable of vertical motion along a vertical axis.

As used herein, "RPR" shall refer to a combination of joints of the device in a revolute-prismatic-revolute arrangement that is configured for increased device stability, wherein the mass of the motors and/or gears and other bulky items in the device may be centered around a base of the device and housed in the tower. SCARA robotic arm configurations typically have at least three basic degrees of freedom (or axes of rotation) with the fourth axis usually located on an end effector to orient a tool or gripper. Two axes are rotational or revolute (R) and are mediated by rotational or revolute joints. A third axis has a linear motion or movement and is mediated by a prismatic joint (P). In typical RRP configurations, the bulk of the mass (comprising motors and/or gears and other moving parts) is usually spread over the entire body of the robotic arm leading to higher inertias during movement and slower resulting operating speeds. The RPR configuration employed in the device utilizes a first and a third axis of rotation as an R axis, and a second axis of movement as a P axis. This configuration allows for full 360-degree rotation of the device for increased workspace reach. Further, having the second axis be prismatic allows for greater motion of the robotic arms along a vertical Z-axis, allowing for an increased height of the robotic arms over the workspace. As such, total workspace area and available workspace height in the Z axis is larger than with a typical RRP configuration. Further, the RPR configuration of the device allows faster operating speeds of the arms, as motors and/or gears may be centered closer to the center of the base, leading to lower inertias when moving the arms.

The robotic arms may be used for rapid prototyping, and in some embodiments may utilize additive or subtractive manufacturing in the personal digital fabrication domain. In some embodiments, the robotic arms may comprise one or more end effectors, which may include, for example, a hot-pluggable, interchangeable end effector interface for multiple tool such as Fused Deposition Modeling (FDM) and Stereolithography (SLA) 3D printing, light duty CNC milling, laser engraving/cutting, pick and place and other assembly, fabrication, and process automation operations. The device utilizes a device workspace for fabrication or manufacturing, and the device workspace may be significantly larger than a footprint of the device, making the device portable and capable of use in non-commercial settings.

In some embodiments, the device may be configured to operate as a 3-axis SCARA configuration robot with two or more arms and having an open format desktop fabrication and assembly area or workspace. In some embodiments, the device may comprise a plurality of core functions, the core functions being one or more of configuration, transmission, autolevelling, end effector/add-on interface, software/UI, and collision detection. In some embodiments, the device may have a high ratio gearing transmission contained in small packages, such as harmonic drives. In some embodiments, the device is configured to be able to house motors, electronics and other components that are miniaturized or in a very small form. In some embodiments, the device may further comprise a mounting system so that the device may be bolted down or permanently mounted to counter any center of gravity displacement caused by arm motion or movement. In some embodiments, the device further comprises a trainability feature which allows a user to teach an arm of the device to perform or repeat specific actions and/or collaborate with another device to achieve a common assembly/fabrication task. In some embodiments, the user may provide coordinates through a software/UI and then would save these coordinates for playback later. This way the device could be trained to perform specific tasks with precision.

In some embodiments, the device utilizes a unified architecture to allow for the use of interchangeable end effectors, regardless of the functional characteristics and/or requirements of the end effectors. The unified architecture can comprise electrical and/or mechanical connections for the various end effectors and/or modules that allows for the interchangeability of the end effectors, modules, and/or other components. Thus, various end effectors and/or modules can be electrically and/or mechanically coupled to the device such that the end effectors and/or modules are removable and interchangeable as the unified architecture allows the device to support and connect to any end effector or module. For example, end effectors that utilize a variety of speeds of motion when in use can be used with the device. The architecture of the device can be optimized for multiple applications such that a variety of joints, as described in more detail below, can be stiffened to resist various types of loads, including radial, axial, and moment loads, in order to provide a support structure that is rigid enough for certain applications, including CNC milling and light duty payload movement and/or manipulation. The gearing ratios and drivetrain can also be selected to minimize backlash and maximize precision to keep the device up to date in terms of performance relative to the applications being used. For example, the device can provide as high a print quality as a standard box-style Cartesian printer, while still allowing the device to be used for applications that would apply larger loads and strain on the device. Manufacturing portions of the device, including the arms, with lighter materials and rigid, channeled geometries, with bridged support structure, can allow the arms to achieve higher speeds, required for tasks such as 3D printing and pick and place functionality, while maintaining rigidity, for tasks such as CNC milling.

In reference to FIG. 1A, in some embodiments, a device 10 comprises a tower 19 housed under a shell, or sleeve, 20, with the tower 19 being supported by a base 11. The base 11 is connected to the tower 19 with a first joint 12 defining a first axis of movement of the tower 19 with respect to the base. The device further comprises a first arm 13 connected to the tower 19 via a second joint 14 defining a second axis of movement of the first arm 13 relative to the tower 19. A second arm 15 may be connected to the first arm 13 via a third joint 16 defining a third axis of movement of the second arm 15 relative to the first arm 13. In some embodiments, the device 10 has a weight that can range from 15 to about 25 pounds. For example, the device 10 can have a weight of about 18 pounds. In some embodiments, the height of the device 10 may be from 15 to 25 inches, or from 18 to 22 inches. For example, the base 11 and tower 19 may have a combined height of 20 inches. In some embodiments, the footprint of the device 10 may be from about 14 to about 20 square inches. For example, the device 10 can have a total footprint (not pictured) of about 17.5 square inches. In some embodiments, the total arm reach of the device 10 may be from about 12 inches to about 20 inches. For example, the device 10 can have a total arm reach of 16 inches.

Figure 12:
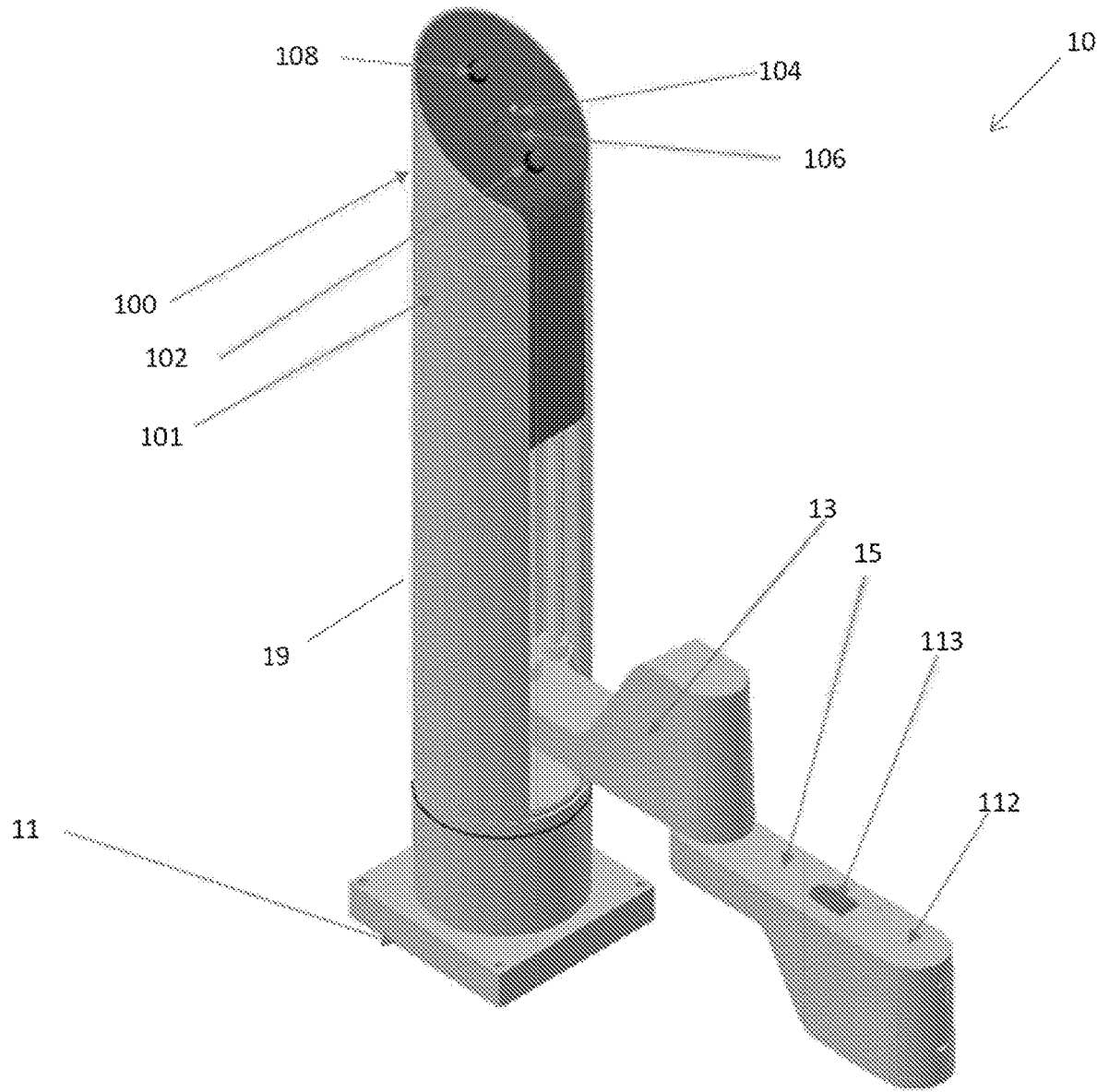
FIG. 12 is an image of a robotic arm according to other embodiments of the present disclosure.

The tower 19 may further comprise one or more add-on sections or modules 18. The modules 18 provide various types of functionality to the device 10, including mechanical and/or electrical modules that work in conjunction with the end effector coupled to the device. In some embodiments, the device 10 includes a module that is configured to control the various features of the device 10. As shown in FIGS. 12-13, the device 10 can include a control module 100 positioned on top of the tower 19. The control module 100 stacks on top of any other modules when present or directly on top of the tower when no additional module is present. The control module 100 includes an interface to allow the user to interact with the control module 100 to control the device 10. The control module 100 may facilitate user interaction with one or more buttons, indicator lights, wife connectivity and storage devices/readers such as an SD card reader. In some embodiments, for example shown in FIGS. 12-13, the control module 100 includes an interaction button 102 that can be used to turn the device 10 on or off. One or more LEDs 104 can indicate the status of various components of the device 10 to the user. The control module 100 can also include an SD card slot 106 and an emergency stop button 108 that can be used to cease operation of the device 10 if needed. In some embodiments, disparate remote or connected modules may be physically or wirelessly connected so that they may be moved around by the user while still in communication with the base unit. One example of this may be a remote scanner which is used to inspect crack propagation in pipe lines.

Additional modules, such as accessory modules 101, can be in the form of electrical and/or mechanical modules that include features to work with the device and end effectors to facilitate the function of the end effectors. The accessory modules 101 can be swapped in and out to provide a variety of functions depending on the end effector that is coupled to the device and the needs of the applications being performed by the device 10. Any number of accessory modules 101 can be removably coupled to the tower 19, or no accessory modules 101 can be used, depending on the needs of the end effector being used by the device 10.

In some embodiments, the device can include one or more accessory modules 101 that comprise a storage recess under a top portion of the tower 19, where feature extensions or end effector add-ons may be placed and connected to system electronics via mating connectors. In some embodiments, the end effector add-ons may include a vacuum pump for pick and place, electronics for laser modules, an extruder assembly for 3D printing, or other such apparatus for enhancing capabilities of the device.

In some embodiments, the add-on section 18 is designed as one or more modules which can be stacked on top of the tower 19. In such an embodiment, the electronics and mating connectors would be included on, or inside the module. In some embodiments, the accessory modules may be stacked on top of each other, as shown in FIG. 13, in order to further the capabilities of the device 10, by enabling multiple instances of the same function or two or more functions simultaneously. In such an embodiment, for example, the device would be able to support multiple extruders for 3D printing, or be capable of having one or more 3D printing extruders, along with a vacuum pump and other modules simultaneously.

The various modules can be electrically and mechanically connected to one another, the control module, and the device 10. In some embodiments, the accessory modules 101 are designed with a unified connection system at the top and the bottom of each accessory module 101. The same connectors are used at both ends of the accessory modules 101, allowing the accessory modules 101 to be stackable, and allowing for the stacking of one or more accessory modules 101 on top of each other. In one exemplary embodiment, the bottom surface of the control module 100 and both top and bottom surfaces of the accessory modules 101 include at least one fastening mechanism 116, as shown in FIG. 13, to allow the modules 100, 101 to removably mechanically fasten to one another. The fastening mechanisms 116 can have a variety of forms, including but not limited to a magnetic connector, a friction fit mechanism, a ball and socket connector, or a snap fit connector. The modules 100, 101 can also optionally include features to facilitate the separation of the modules. In some embodiments, illustrated in FIG. 14B, the modules can include a release feature, such as a release button 127 to help with the separation of the modules, if needed, depending on the type of fastening mechanism 116 that is used. The accessory module 101, and the surface of the tower on which the modules sit can also optionally include a recess 128 that is sized and shaped to accommodate the release button 127. The modules 100, 101 can also include additional features, such as the sloping edge 117 shown on the top surface of module 101, as well as on a surface of the tower 19, to facilitate the ease of stacking of the modules 100, 101. One or more electrical contacts 114 are positioned on the bottom surface of the control module 100 and the top and bottom surfaces of the accessory module 101 to allow for the electrical connection between the various modules 100, 101 to integrate communication between the modules 100, 101, and between the device 10 and the modules 100, 101. Various electrical connection schemes can be used, but in some embodiments, a wiring harness inside each module is designed to pass through any connections unused by the accessory module, such that various modules can be stacked and run simultaneously. For example, an accessory module having a 3D printer extruder (or other accessory module with a stepper motor, such as a solder wire feeder) can be stacked with an accessory module having a vacuum pump module (or other module requiring PWM and/or GPIO signals, such as a CNC controller), and both modules can be run simultaneously using the wiring harness inside each module. In some embodiments, an electrical scheme allows for stacking two or more modules of the same type such that the modules can run simultaneously. For example, this can be used in the case of a multiple extruder 3D printer, or running multiple pick and place end-effectors simultaneously.

The motion between the various components of the device 10 using the joints 12, 14, 16 can be achieved in a variety of ways. Referencing FIG. 1C, in some embodiments, the first joint 12 is housed in the base 11. The first joint 12 can be in the form of a revolute joint configured for rotational movement as depicted in FIG. 1C, which may be capable of rotating the device 10 at least 180 degrees. Referencing FIG. 1A and FIG. 1B, in some embodiments, the tower 19 comprises a channel 21 containing the second joint 14, which may be a prismatic joint 14, for connecting the tower 19 to the first arm 13 and moving the first arm 13 relative to the tower 19 along a vertical axis of movement within the channel 21. The channel 21 may be of a length from 6 to about 12 inches or more, and preferably of about 10 inches. FIG. 2 depicts a close up of a connection between the second arm 15 and the first arm 13 via the third joint 16. In some embodiments, the third joint 16 can be in the form of a revolute joint configured for rotational movement between the first arm 13 and the second arm 15.

As explained above, the first joint 12 may comprise a revolute joint (R) 12 capable of conferring a rotational movement to the tower 19 in relation to the base 11. The second joint 14 may comprise a prismatic joint (P) capable of conferring movement in a vertical direction of the first arm 13 along a vertical axis of the tower 19. The third joint 16 may comprise a revolute joint (R), conferring rotational movement to the second arm 15 in relation to the first arm 13. In some embodiments, the RPR joint arrangement may be configured for increased device 10 stability as the mass of the device 10 is centered near the base 11. Additionally, the device 10 may include motors for the base revolute joint 12 and the second axis prismatic joint 14, which may be aligned with a center axis of the base 11 for additional stability. In some embodiments, the first joint 12 may be configured to rotate at least 240 degrees in rotation. In some embodiments, the first joint 12 may be configured to rotate a complete 360 degrees in rotation.

Figure 1B:
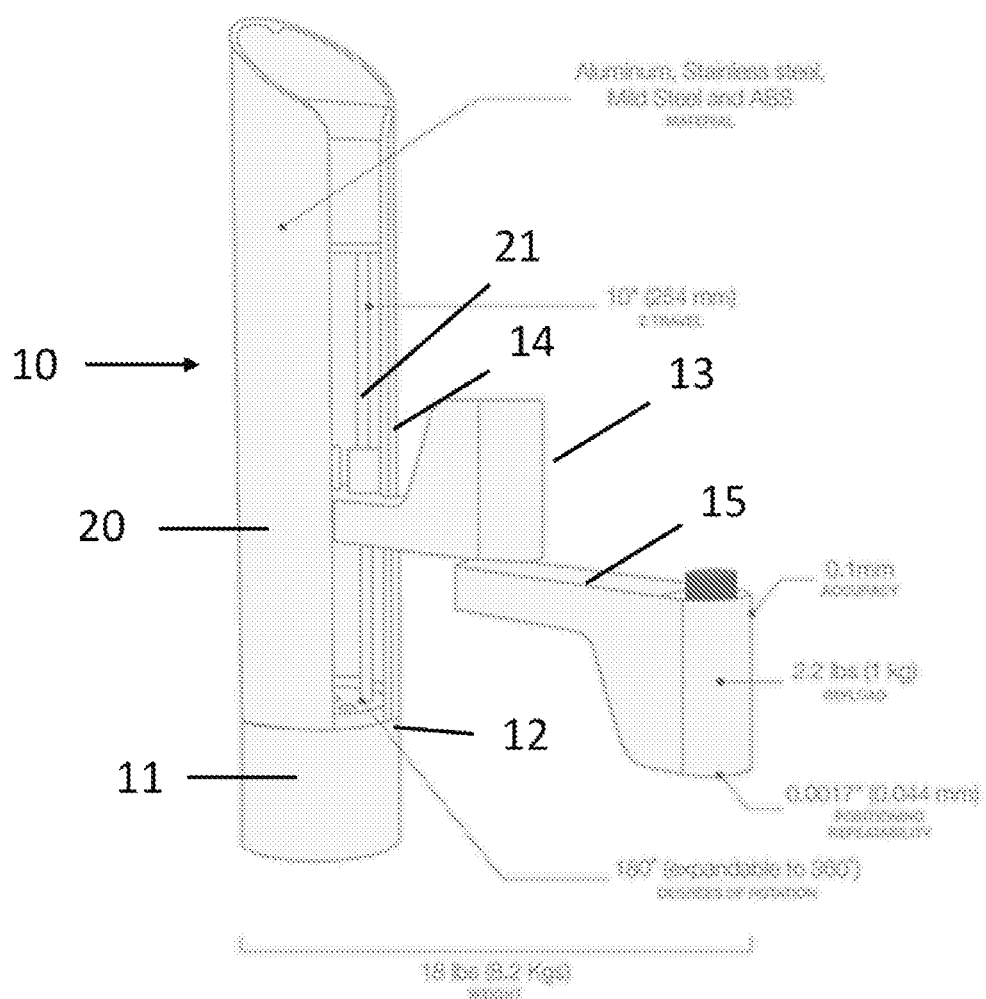
FIG. 1B is a 3-d side view of an embodiment of a device of the present disclosure.
Figure 1C:
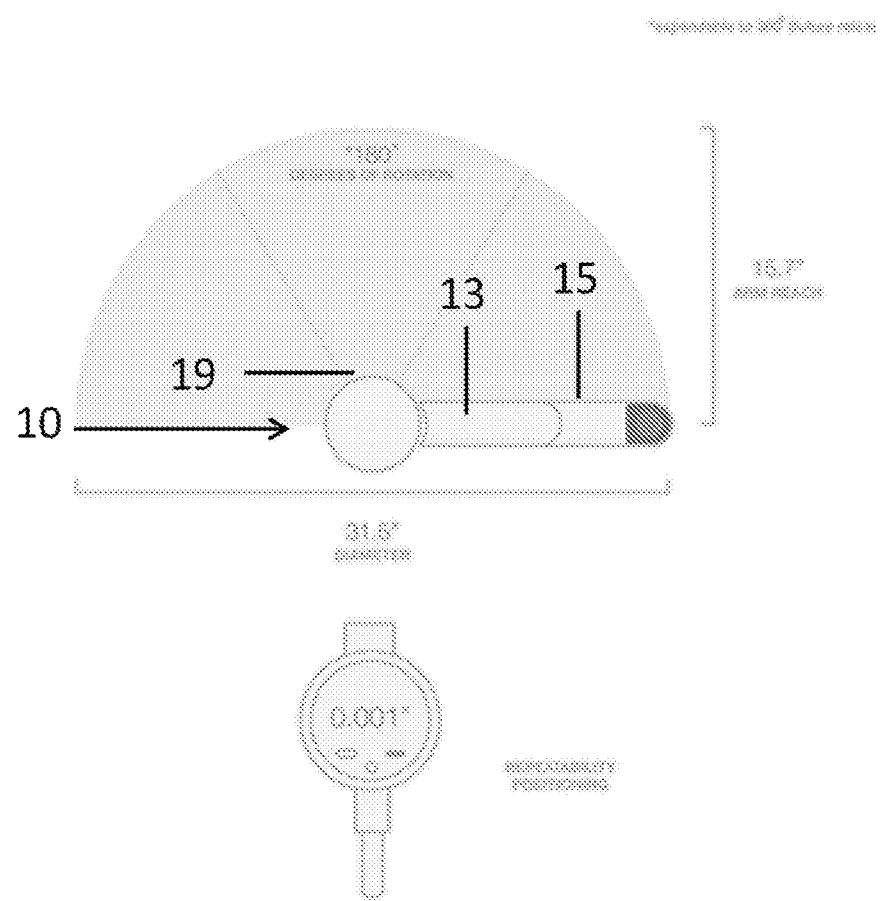
FIG. 1C is a top view of an embodiment of a device of the present disclosure.
Figure 2:
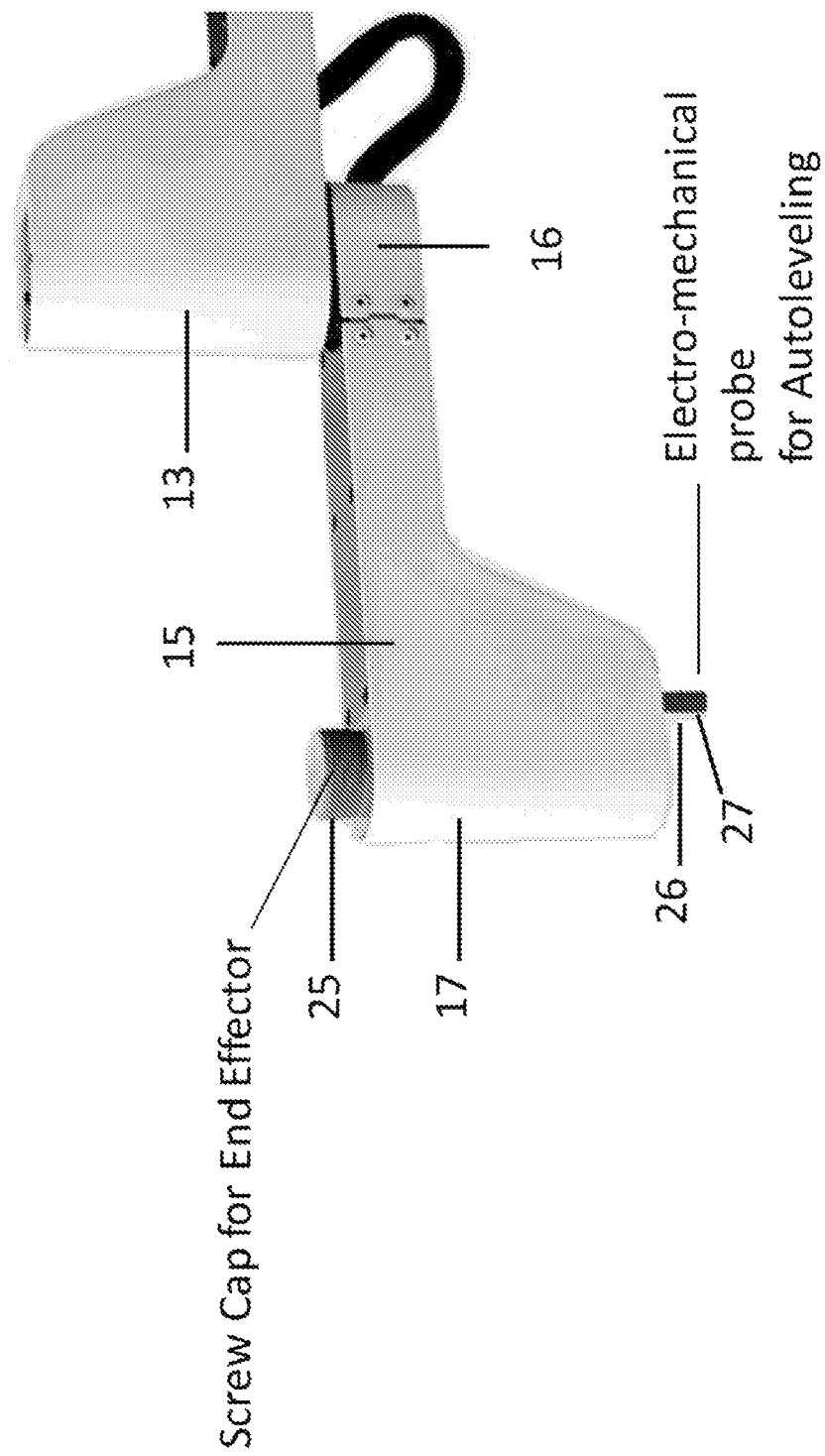
FIG. 2 is a side view image of an embodiment of a robotic arm having an electro-mechanical end effector interface according to some embodiments of the present disclosure.

Referencing FIG. 1B, the shell 20 may comprise a metal or plastic. In some embodiments, the metal may be aluminum or an aluminum alloy, stainless steel, or mild steel. In some embodiments, the plastic may be ABS, PMMA, nylon or any other materials which achieve the same or better structural integrity of the device. In some embodiments, the metal may be any structural shell which ties into the rigidity of the main support architecture. This enhanced rigidity can enable more aggressive tool working such as CNC milling.

An end effector can be removably coupled to the device 10 using a variety of mechanisms and in such a way that any end effector can be coupled to the device 10. As explained above, a unified architecture can be used to allow for the use of interchangeable end effectors, regardless of the functional characteristics of the end effectors. The unified architecture facilitates mechanical and/or electrical connections between the end effectors and the device 10, such that the end effector is engaged mechanically and/or electrically simply by being coupled to the device 10. For example, the end effector may be coupled to the device 10 such that the user is aware of the engagement between the two components, for example, in the form of a clicking sound when the engagement occurs. This can be an indication that the end effector is both mechanically and electrically connected to the device 10.

In some embodiments, the unified architecture of the device 10 can comprise an end effector interface 17 that is located at a distal end of the second arm 15. The end effector interface 17 can have a variety of configurations to allow an end effector to couple to the second arm 15. The end effector interface 17 is configured for swapping out end effectors for different applications and capabilities which makes the device 10 multipurpose and upgradable. In some embodiments, shown in FIG. 2, the end effector interface 17 includes a screw cap 25 and further comprises an electromechanical probe 26. Upon connection, the end effectors may be locked in place relative to the second arm 15 via the screw cap 25 or via any other connection means. In some embodiments, the end effectors may have an automatic connection medium such as spring loaded contacts, magnetic electrical contacts, or mating connectors which mate with the second arm 15 of the device 10.

Figure 14A:
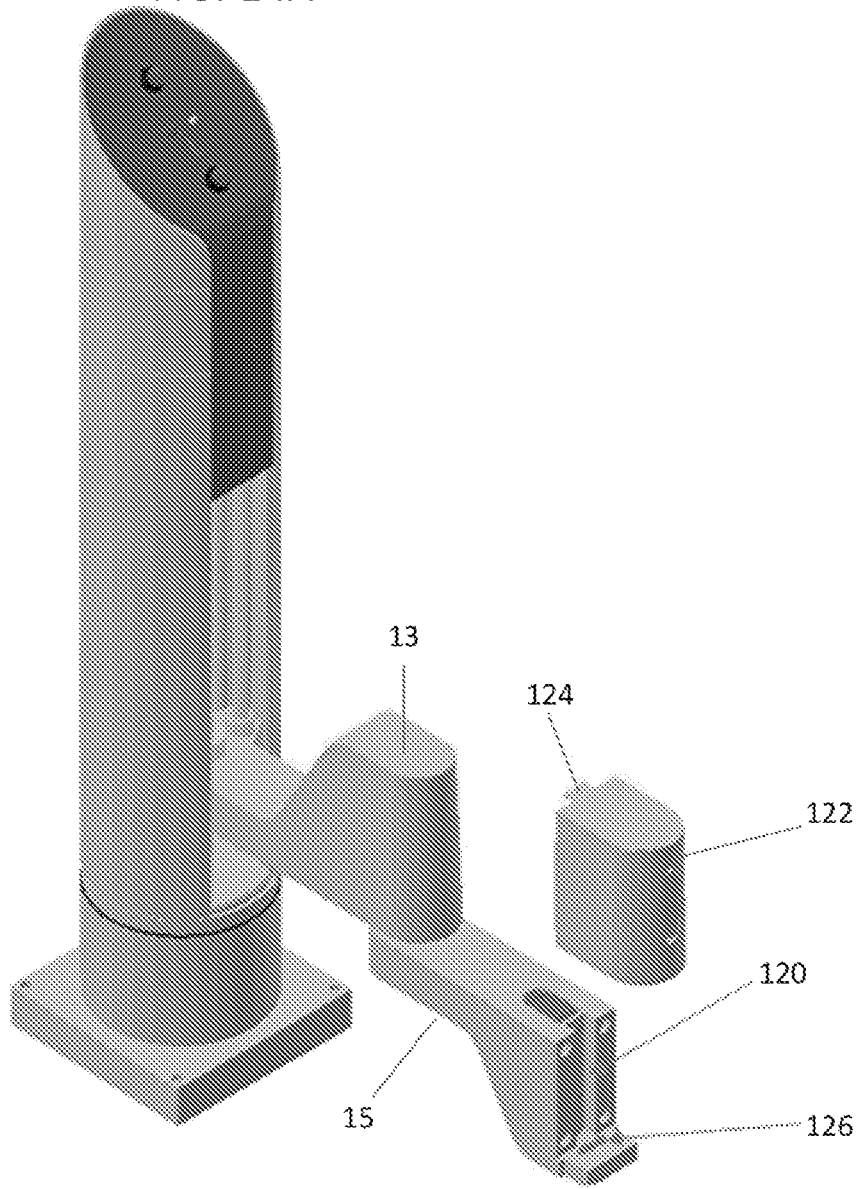

In some embodiments, the end effector interface 17 can be in the form of a guide rail positioned on the distal end of the second arm 15. Referring to FIGS. 13, 14A, and 14B, an end effector 122 may be secured in place on the second arm 15 by sliding a portion of the end effector 122 into the self-locking guide rail 120 that can include spring-loaded release functionality. For example, the end effector 122 can include an elongate protrusion 124 running along a middle portion of the end effector 122 that is sized and shaped to slide into the guide rail 120 formed in the end effector interface 17 to facilitate the removable connection between the end effector 122 and the device 10. The end effector 122 can include a release mechanism 113, shown in FIG. 12 that is configured to allow the end effector 122 to be removed from the second arm 15 of the device 10. The guide rail configuration of the end effector interface 17 would facilitate the mechanical and electrical connections between the end effector and the end effector interface 17 simultaneously. As shown in FIG. 14A, the end effector interface includes one or more electrical contacts 126 to allows for an electrical connection between the device 10 and the end effector 122, which has corresponding electrical contacts to electrically couple with the contacts 126. Thus, end effectors, or tool heads, can be swapped out and attached with a tool-less connection, allowing for multiple devices to be removed and replaced and to be controlled by CNC motion of the device 10. In other embodiments, the second arm 15 may have a recess or other opening on its underside through which an end effector may slide in and mate with the second arm 15.

As explained above, the end effectors can also be electrically connected to the device to allow for the control of the functionality of the end effector. As explained above, a unified electrical architecture can be used to allow for the use of interchangeable end effectors, regardless of the functional characteristics of the end effectors. The electrical connectivity between the end effectors and the device are configured in such a way to allow any end effector to be removably coupled to the device and connected electrically thereto. In some embodiments, the power pins of the electrical contacts 126 are configured for use with all end effectors such that any end effector can have the voltages they need to operate. In some embodiments, connectors on the arms of the device have two 12V lines, a 5V line, and a 3.3V line available. It will be understood that any voltage lines can be used or changed, including changing one or both of the 12V lines to 24V, and adding a 1.8V, depending on the voltage needs of the available end effectors. The ground contacts on the end-effector can connect, through the electrical connections via wires, to a power MOSFET that can be located, for example, on the main control board located in the base 11 of the device 10. The one or more MOSFETs can act as voltage controlled current source (VCCS) to limit current to the end effectors. This can be used, for example, if an end effector needs to run at a higher or lower temperature (in case of a FDM 3D printer hot-end, or a soldering iron, or foam cutter, or similar tool), or if an end effector needs to run at a lower power, to conserve energy, or to generate a lighter pattern (in case of a laser engraver), or at a slower speed (in case of a screw driver tool, or a drilling tool).

The electrical connectors on the arm of the device 10 can additionally include connections for attaching stepper motors. In one embodiment, the stepper motor can be used to run a $4^{th}$ axis end effector, such as pick and place end effector, a claw gripper end effector, a compensating camera gantry end effector, and similar end effectors.

Various other features can be included in the unified electrical architecture for use with various end effectors depending on their functionality. The electrical connectors can also include one or more thermistor connections which can be used to monitor hot-end temperature, or provide temperature control depending on the end effector being used with the device 10. General purpose input/output (GPIO) connections can be present on the arm's connector to provide the capability to detect the attachment or detachment of an end effector and/or which end effector has been attached, and to send PWM, PPM signals (to drive servos, pulse LEDs, change power levels on fans, and diode lasers, etc.).

Serial communication (for example, I2C, SPI, and UART) may also be made available through the connectors, to read sensors and provide a unified communication platform for all of our end-effector. For example, I2C can be utilized to allow the end-effector to communicate with an EEPROM along with sensors located on the end effector.

The device 10 can also include features to allow the device 10 to be positioned on any surface during use. In some embodiments, the device 10 may include an electro-mechanical probe 26 with an autolevelling function. The probe 26 has a tip 27 positioned to allow any clean, flat surface to be used as the device's workspace area. Typically, in desktop fabrication tools, a special purpose bed or platform is required over which work is carried out. This large bed or platform adds cost and takes considerable space making the device heavy and difficult to move around. With the device 10, any clean and flat surface can be used as the device's work area, which means that the device 10 takes much less space, costs less and is easy to carry around. In some embodiments, the electro-mechanical probe 26 may be configured to (1) measure a height of the device workspace (not pictured) at different points on the device workspace, and (2) help a microcontroller/microprocessor or a computer to prepare a 'digital map' of a slope or a contour of a work surface (not pictured). Calculations to obtain an equation of a plane for the workspace can be performed by a microcontroller, which may read the height of the workspace at different points with the help of the electro-mechanical autolevelling probe.

Figure 18A:
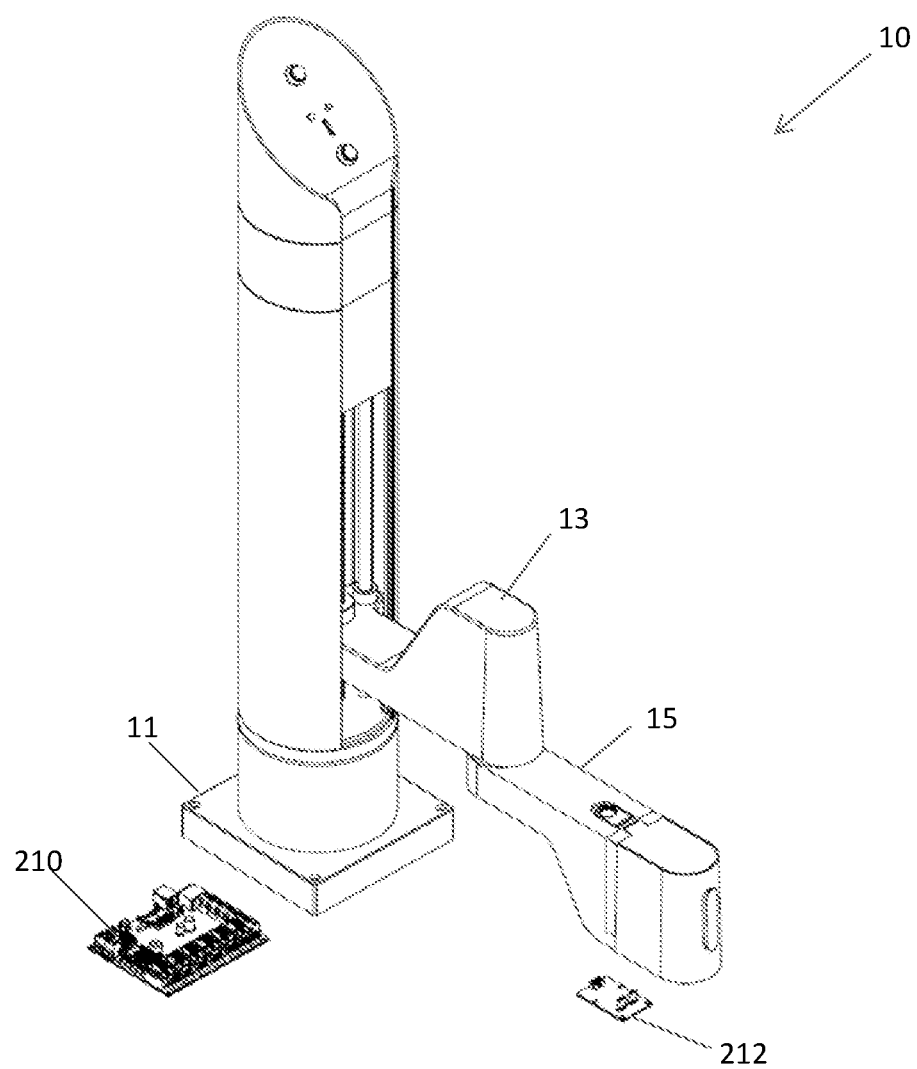
FIG. 18A is an image of a robotic arm according to other embodiments of the present disclosure including an autolevelling sensor.

As shown in FIG. 18, a microcontroller 210 positioned in the base 11 of the device 10 can communicate with an autolevelling sensor 212 positioned in a portion of the second arm 15 of the device 10. In some embodiments, the height at 3 different points on the work surface is measured by the autolevelling sensor 212 and these values are then relayed to the microcontroller/microprocessor which in turn inputs the values into an equation of the plane. A normal and a gradient of the plane is then calculated such that the device knows the height of each point on the plane and follows this slope precisely when 3D printing on the surface or carrying out any other fabrication task. In some embodiments, the height is measured at two or more points by the autolevelling sensor 212. These measurements are then relayed to the microcontroller/microprocessor that uses a bilinear interpolation equation, or a bicubic interpolation equation, or both equations to generate an accurate map of the work surface. This in turn allows the device to follow curves and slopes precisely when carrying out precision fabrication and automation tasks such as 3D printing, Pick and Place, and any other fabrication task. In some embodiments, the electro-mechanical probe 26 may utilize a microswitch, end-stop switch, optical/photocoupler switch, laser range finder, proximity switch and/or any such device that allows sensing the height of the work surface. In an alternate embodiment, the electro-mechanical probe 26 may be replaced by an electrical, mechanical, or pneumatic probe, or a sensor.

Figure 18B:
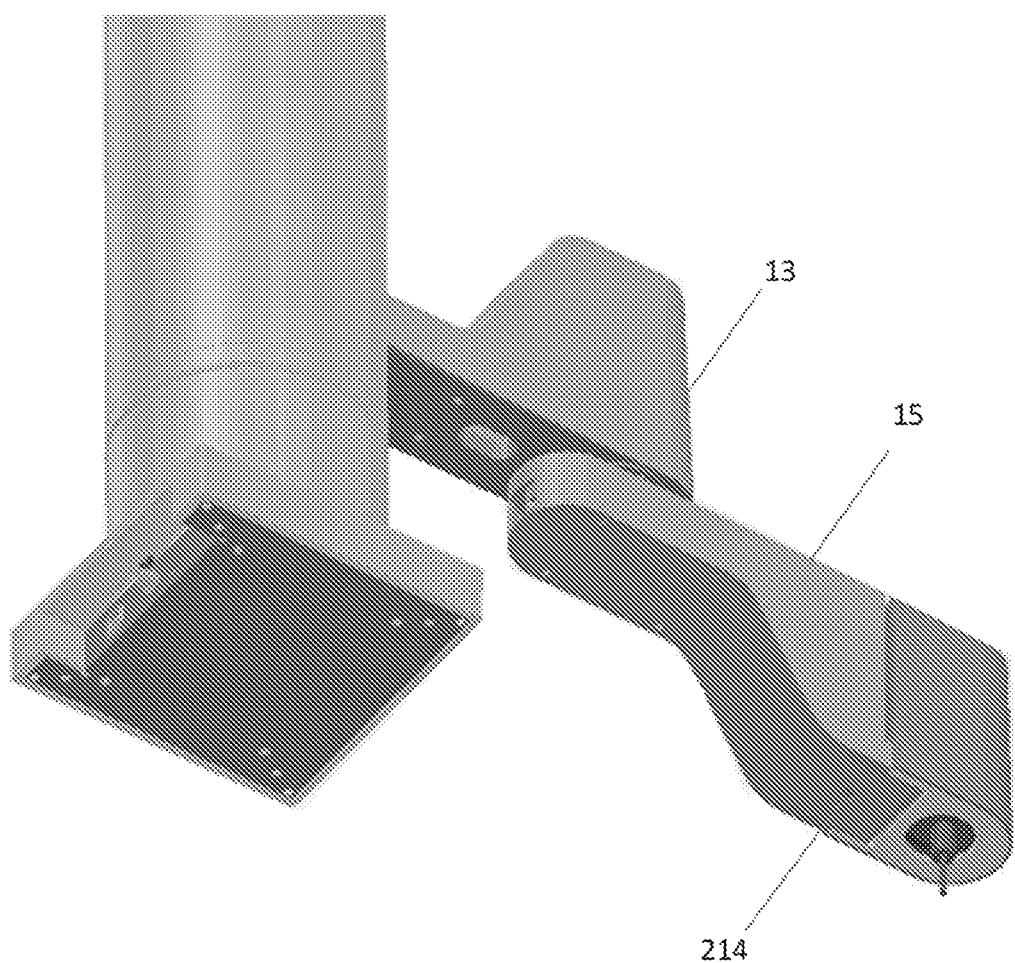
FIG. 18B is an image of the robotic arm of FIG. 18A including the autolevelling sensor and one or more indicators.

Referring to FIG. 18B, in some embodiments the device 10 can include various indicators positioned on one or arms to communicate information to the user about the state of the device and/or the end effector. As shown in FIG. 18B, the indicators can be in the form of one or more LEDs 214 positioned on a bottom surface of the second arm 15 of the device 10. In some embodiments, the LEDs 214 on the second arm 15 can be configured to work in tandem with the LEDs 104 of the control module 100 shown in FIG. 12 to indicate a variety of information to a user. In one example, the LEDs 214 can be illuminated in a certain pattern to indicate that an end effector has completed its function. In another example, the LEDs 104, 214 can be used to indicate information regarding an error with the device, the modules, and/or the end effector. For example, if an end effector is separated from the device or becomes misaligned, the LEDs 104 on the control module can blink in a certain color and/or pattern to indicate an error, and the LEDs 214 on the arm 15 can blink in the same or similar color and/or pattern. This can indicate to a user that the location of the error is the end effector and not a connectivity or device issue as both the LEDs 104, 214 are behaving in a similar manner. It will be understood that the LEDs 104, 214 can be used alone or in any combination to indicate a variety of information to a user relating to any component of the device 10. It will also be understood that the LEDs 214 can be positioned anywhere along the underside of either arm 13, 15.

Referring now to FIGS. 3A and 3B, in some embodiments the device 10 may have a collision detection capability. The device 10 may further comprise an output section of a motor/gear 32 with an output shaft 37. In some embodiments, the device 10 further comprises a PCB board 34 with a position sensor 36, such as an absolute magnetic encoder IC, an accelerometer, or other type of position sensing device, aligned with a center axis 33 of the motor/gear 32 and output shaft 37. A circular magnet 35, for example a neodymium magnet, may be mounted on top of the output shaft 37 with its center axis also aligned with the position sensor 36 and motor/gear 32 and output shaft 37. During normal function of the device 10, the output shaft 37 of the motor/gear 32 rotates clockwise or counterclockwise, the magnet 35 mounted over the shaft 37 also rotates with the output shaft 37. The position sensor 36 is fixed and does not move relative to the magnet 35 or output shaft 37. When the magnet 35 rotates with respect to the position sensor 36, a magnetic field generated by the magnet 35 changes, which is registered by the position sensor 36 and an exact rotary position of the magnet 35 and output shaft 37 of the motor/gear 32 is relayed to a microcontroller/microprocessor (not pictured). While running the device 10, if there is a collision or an arm fails to move to a target position, the microcontroller compares readings of the position sensor 36 and the target position command sent to the stepper motors/gears/transmission. If there is a discrepancy between the readings, the collision detection capability determines the discrepancy to mean that the arms failed to reach the target position and a collision or an abnormal behavior is detected and the device 10 is paused. The collision detection capability ensures that the arms do not cause any damage and that the device is able to detect even minor collisions and take the necessary action. If there is a discrepancy between a target position and an actual position moved then this discrepancy is noted and an appropriate action is taken. In some embodiments, the appropriate action may be notifying the user via a visual indicator or a prompt generated in the software/UI or increasing/decreasing a motor torque or by completely stopping the device 10.

FIG. 4 depicts an exploded view of some embodiments of the device 10. The device 10 comprises a top cover 41, the shell 20, one or more linear guides 43, a first harmonic drive 44, a first stepper motor 45, the base 11, the add-on section 18, a second stepper motor 48, and a second harmonic drive 49. The device 10 can include any number of linear guides. For example, in some embodiments, the linear guides 43 may comprise two to four linear guides. In another embodiment, the linear guides 43 may comprise more than four linear guides. In other embodiments, the device 10 may include a single linear guide.

In some embodiments, a transmission function may be required for revolute or rotational joints of the device to achieve high torque and low speeds for arm movement. The transmission function may comprise, but is not limited to, harmonic/strain wave gearing, timing belts and pulleys, planetary/epicyclic gearing, friction/traction drives, metal belts/bands, steel cabling, worm gearing, and slew drives. A low backlash (<3 arcminutes) means of gearing may be included to attain high accuracy for target applications.

Figure 5A:
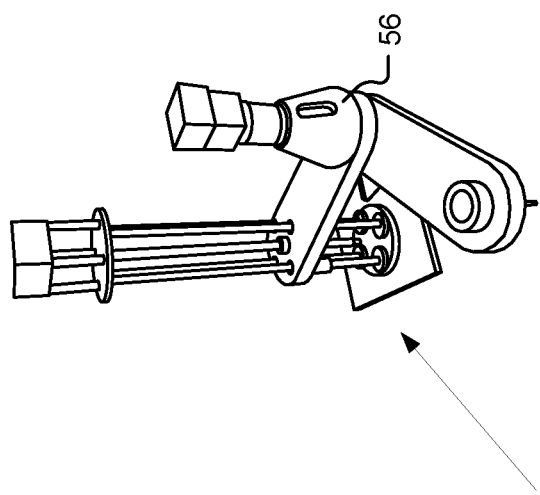
FIG. 5A is an embodiment of a device of the present disclosure using timing belts and pulleys for transmission.
Figure 5B:
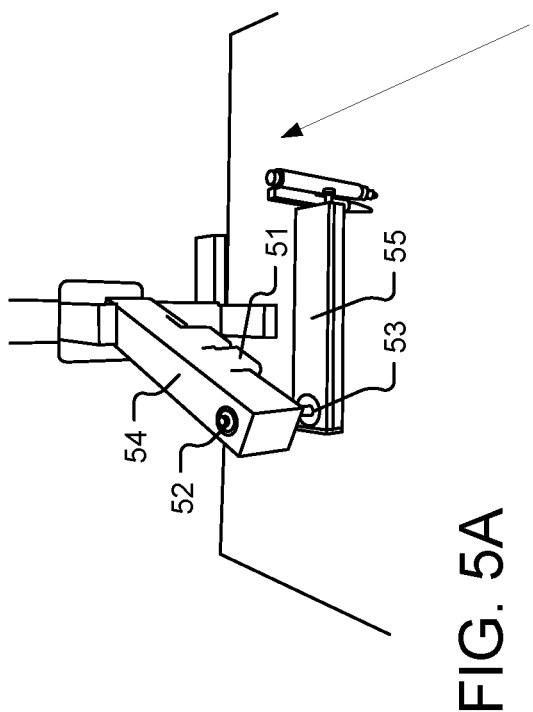
FIG. 5B is an embodiment of a device of the present disclosure having timing belts and pulleys for transmission.
Figure 5C:
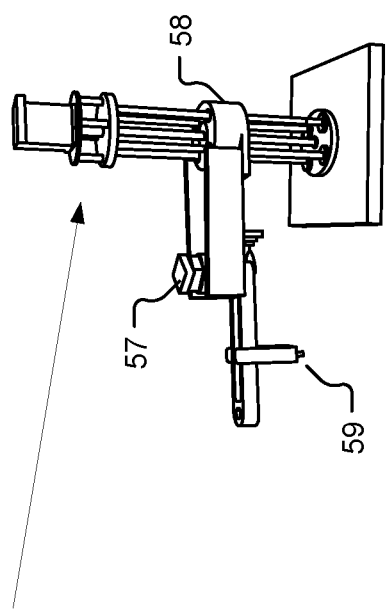
FIG. 5C is an embodiment of a device of the present disclosure having planetary gears for transmission.

As seen in FIGS. 5A and 5B, in some embodiments, a transmission 50 may comprise timing belts 51 and pulleys 52 configured to orient the revolute joints 53 and position the arms 54, 55. A high ratio gearing may be used to keep resolution favorable. As seen in FIG. 5C, in some embodiments the transmission 50 may comprise planetary gears 56.

Figure 5D:
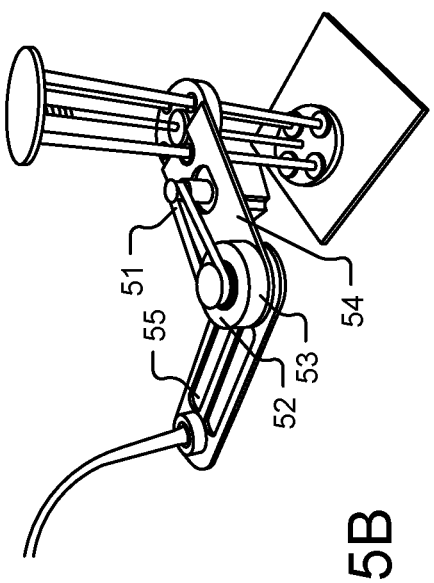
FIG. 5D is an embodiment of a device of the present disclosure having harmonic drives for transmission.

Referring now to FIG. 5D, in some embodiments, the transmission 50 may comprise harmonic strain wave gearing. The harmonic strain wave gearing may comprise high gearing ratios (1:50 to 1:100) for a base 58 and arm revolute 57 joints for high resulting accuracy at the end effector. Gearing ratios and backlash are independent characteristics of motors/gears/transmission. Backlash is dependent on the type of gear used, e.g. strain wave gearing has the least backlash. Angular or linear accuracy is dependent on backlash. RPM and output torque are dependent on gearing ratios. High gearing ratios allow stepper motors to operate at a much higher torque for high load applications such as CNC milling. Also, high ratio gearing increases step angle resolution of the stepper motors used to drive the joints transmission which in turn results in high linear resolution at the end effector. In some embodiments, harmonic drives may be used as the transmission, where a 1.5 arcminutes backlash is achieved at the end effector 59 which is negligible and results in a linear accuracy of about 0.12 mm. Table 1 shows measured positioning errors in various embodiments of the device.

TABLE 1

| Error at end effector | Value/Unit |
| --- | --- |
| MFP 1 (Belt and Pulley) | ±0.50 mm |
| MFP 2 (Planetary Gearing) | ±1.00 mm |
| MFP 3 (Harmonic Gearing) | ±0.12 mm |

Figure 6B:
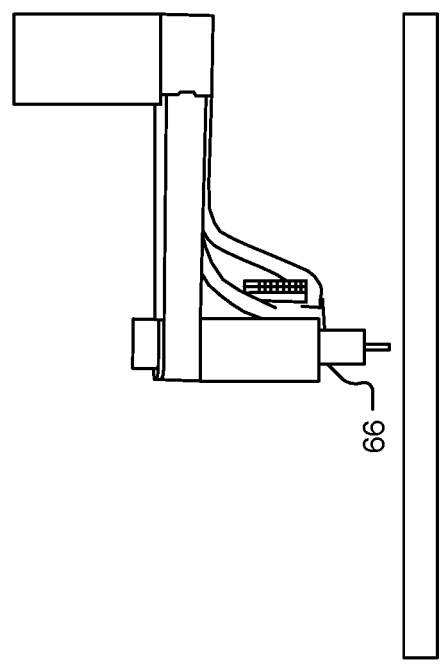
FIG. 6B is a picture of an end effector comprising a CNC milling tool according to some embodiments of the present disclosure.
Figure 6A:
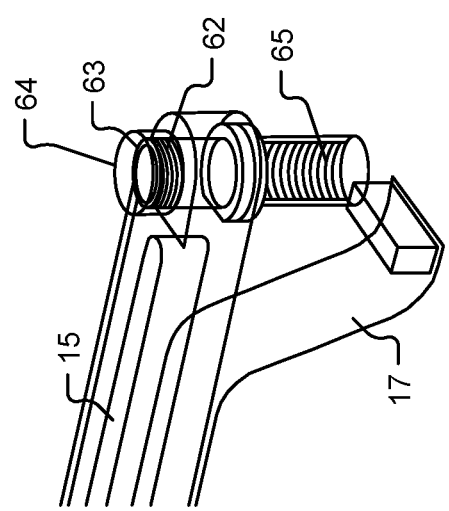
FIG. 6A is an x-ray render of an embodiment of an end effector mounting according to some embodiments of the present disclosure.

Referring to FIG. 6A and FIG. 6B, in some embodiments the end effector interface 17 on the second arm 15 may further comprise an add-on/end effector mechanical interface function with a connection to an end effector 62. The effector 62 may be an electro-mechanical end effector 62 designed to hold a tool 66 for different applications. As seen in FIG. 6B, in some embodiments the tool 66 may be a CNC milling tool. In some embodiments, the effector 62 may have a flat notch on a side of the end effector 62 to position the end effector 62 in a correct orientation. The end effector interface 17 may further comprise a universal mounting that may be attached to the end effector 62 via a screw cap 64 that screws onto a top threaded part 63 of a receptacle 65 and holds the effector 62 in place against the arm 15. The screw cap 64 allows for easy removal and attachment of other end effectors for different uses.

As explained above, since end effector 62 has a unique size, diameter, fitting, and/or electronic/electrical interfacing requirements, the device is configured to be able to adapt to each parameter. In some embodiments, the device 10 may be configured to automatically detect which end effector 62 is attached, and relay this to a software, e.g. via WiFi, so that a displayed UI to a user would be in context of the end effector 62 in use. In one embodiment, the microcontroller can determine which end effector is coupled to the device using a variety of techniques and configure the device according to the requirements of that end effector, including speed of motion of the end effector and voltage requirements for the end effector. In some embodiments, the end effector mechanical interface 17 has to withstand large loads for applications, such as CNC milling, so the connection is configured to be robust enough to withstand the large loads. In some embodiments, the device is configured to be easy to use for a consumer with a switching/swappable mechanism made very easy to use. Any electrical connections for the end effector 62 are made automatically when the end effector 62 is attached, without requiring the consumer to mate any connectors or connect any wires. In some embodiments, spring loaded connectors, magnetic electrical contacts, physically mating connectors or other such means to make electrical connections automatically may be employed. The end effector interface 17 is configured to allow even a novice user to simply slide in and lock the end effector 62 in place for a plug and play experience. In some embodiments, a device design for the end effector 62 allows a connection to occur automatically when the end effector 62 is slid in. In some embodiments, a software may automatically detect which end effector 62 is attached.

Figure 15A:
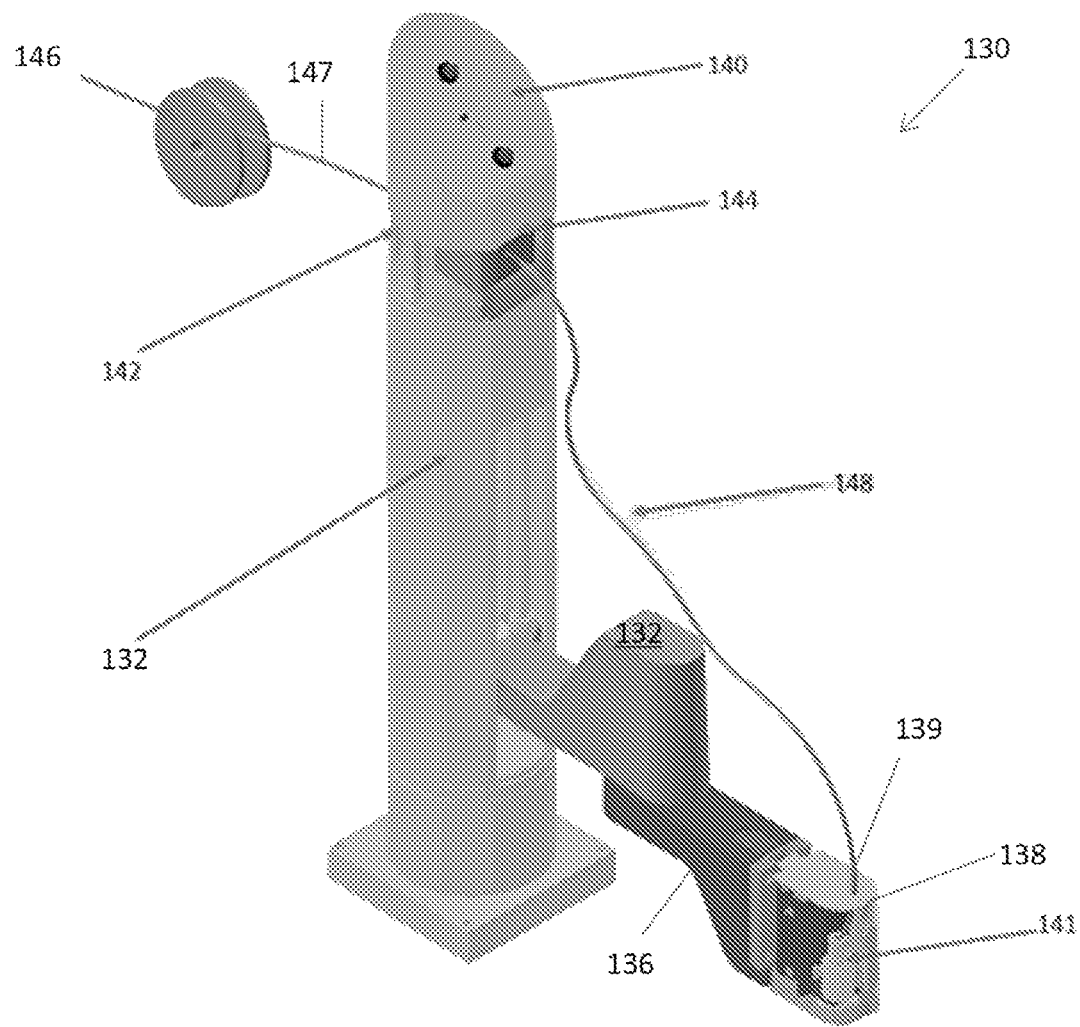
FIG. 15A and FIG. 15B are images of one embodiment of a robotic arm that includes an end effector for 3D printing.
Figure 15B:
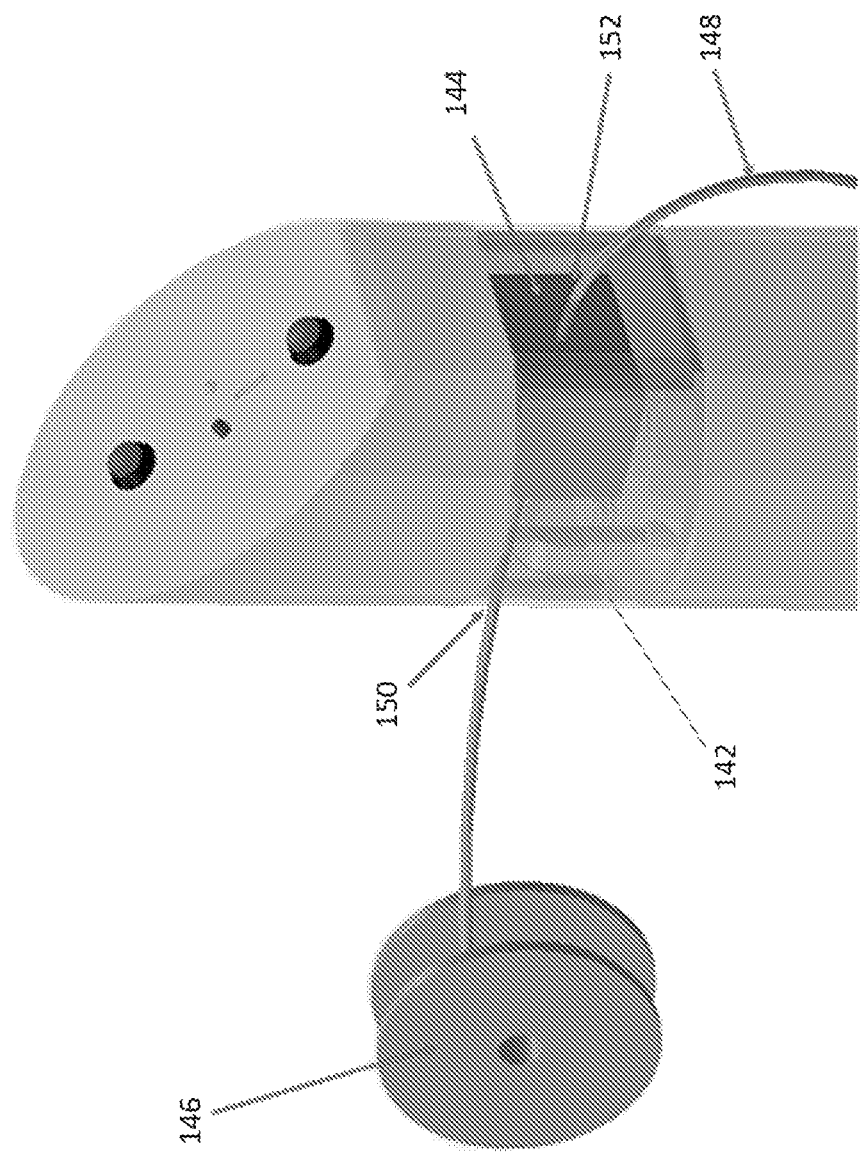

Various different end effectors or tool heads may be used with the device 10, along with various modules depending on the requirements of the end effector. In some embodiments, an end effector for use with the device in the form of a 3D printer is provided, as illustrated in FIGS. 15A-15B. As shown, a device 130 includes a tower 132 having a first arm 134 and a second arm 136 coupled thereto, similar to the device 10 as shown in FIGS. 1A-1B. A control module 140 is positioned on top of the tower 132, with an accessory module 142 stacked between the tower 132 and the control module 140. The accessory module 142 includes features needed for the use of a 3D printer head 141 housed within a 3D printer end effector 138. A filament is needed by the 3D printer end effector 138 to perform its function, so a filament spool 146 is provided to feed a filament 147 into a first opening 150 of the accessory module 142. The filament 147 feeds through a filament extruder motor 144 and out of the accessory module 142 through a second opening 152 in the accessory module 142 and into a filament tube 148. The filament tube 148 is configured to receive the filament 147 in order to deliver the filament 147 to the end effector 138. The filament tube 148 is sized to have an internal diameter sufficient to receive the filament 147 and a length such that the filament tube 148 can span from the accessory module 142 to an opening 139 formed in the end effector 138 to allow the filament 147 to be delivered to the 3D printer head 141 housed within the end effector 138.

Figure 16A:
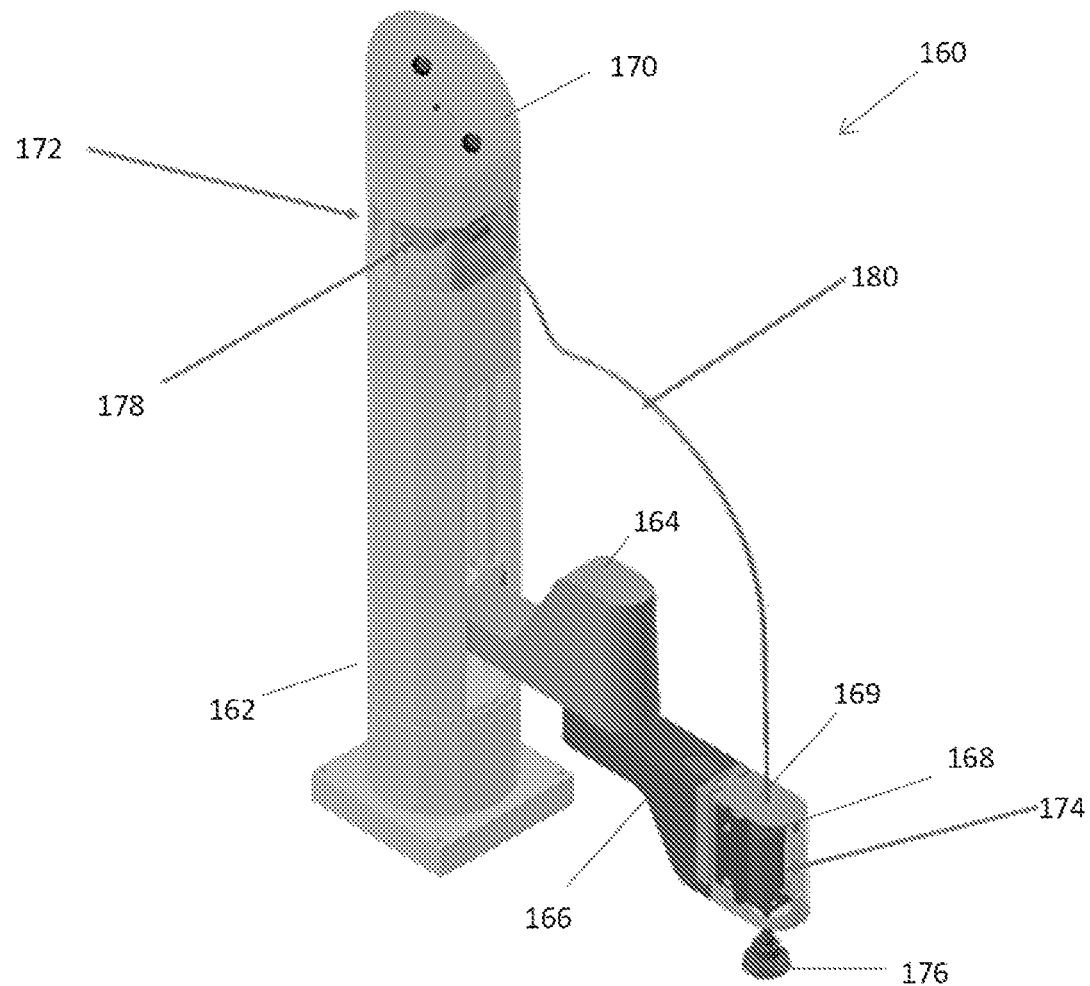
FIG. 16A and FIG. 16B are images of one embodiment of a robotic arm that includes an end effector for pick and place.
Figure 16B:
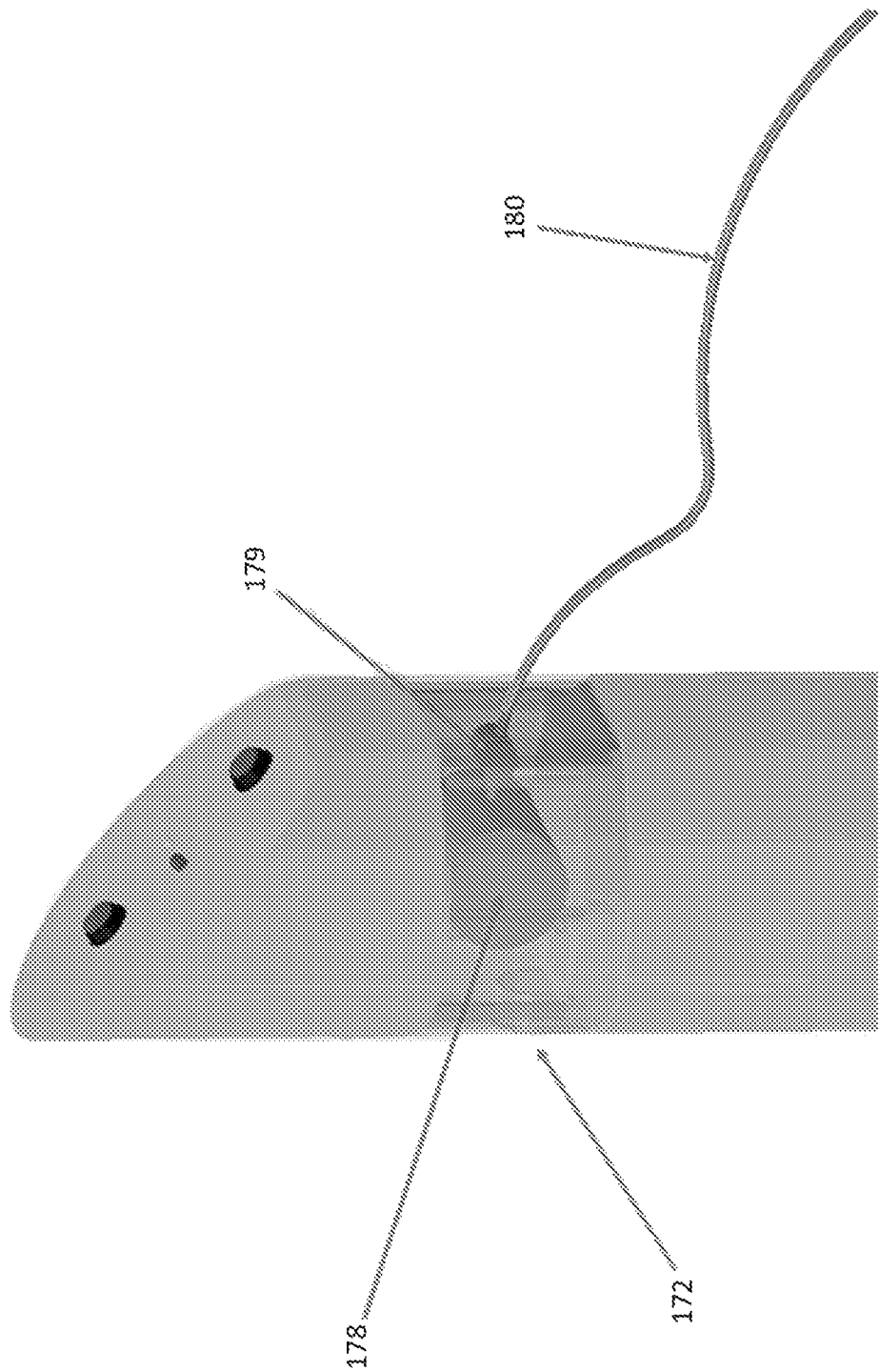

In some embodiments, an end effector for use with the device in the form of a pick and place mechanism is provided, as illustrated in FIGS. 16A-16B. As shown, a device 160 includes a tower 162 having a first arm 164 and a second arm 166 coupled thereto, similar to the device 10 as shown in FIGS. 1A-1B. A control module 170 is positioned on top of the tower 162, with an accessory module 172 stacked between the tower 162 and the control module 170. The accessory module 172 includes features needed for the use of a pick and place end effector 168. The end effector 168 is in the form of a pick and place motor 174 housed within the end effector 168 which is coupled to a suction cup 176 that extends from the end effector 168 and is configured to pick up objects. A vacuum is needed by the end effector 168 to perform its function, so the accessory module 172 includes a vacuum pump 178 and a solenoid valve 179 housed therein to supply the vacuum to the end effector 168. The solenoid valve 179 is configured to provide hard start and stop for the suction cup 176 to pick and place objects using electronic valve control. A vacuum tube 180 is coupled to the accessory module 172 and the end effector 168 to provide the needed vacuum to the end effector 168 to allow the suction cup 176 to pick up objects. The vacuum tube 180 has a length such that the vacuum tube 180 can span from the accessory module 172 to an opening 169 formed in the end effector 168.

Figure 17:
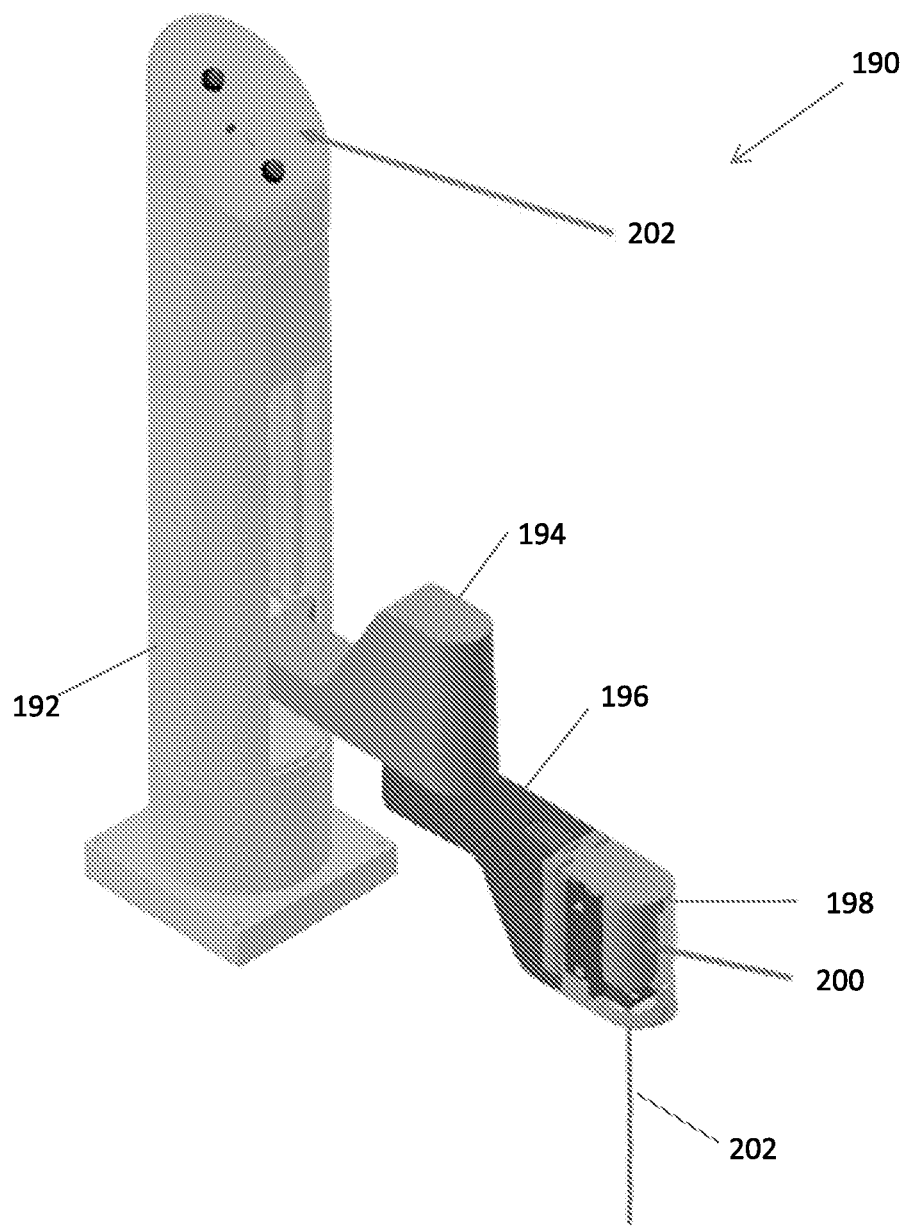
FIG. 17 is an image of one embodiment of a robotic arm that includes an end effector for foam cutting.

In some embodiment, an end effector for use with the device in the form of a foam cutter is provided, as illustrated in FIG. 17. As shown, the device 190 includes a tower 192 having a first arm 194 and a second arm 196 coupled thereto, similar to the device 10 as shown in FIGS. 1A-1B. A control module 170 is positioned on top of the tower 132. An end effector 198 is removably coupled to the second arm 196, and includes a foam cutting tool 200 housed within the end effector 198. The end effector 198 also includes a rigid heater wire 202 extending therefrom and coupled to the foam cutting tool 200 that is configured to heat to such as a temperature as required to cut foam. The end effector 198 includes all the necessary components in order to perform its function so no accessory module is needed. It will be understood that, when all the necessary components needed for use by an end effector can be stored within the end effector or extending therefrom, an accessory module is not required.

Figure 7A:
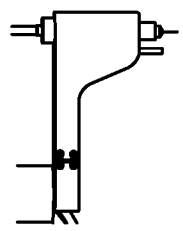
FIGS. 7A-7F depict various embodiments of end effectors mounted to an arm of a device of the present disclosure.
Figure 7C:
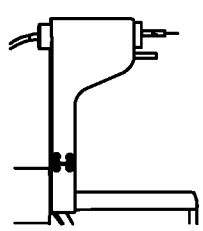
Figure 7E:
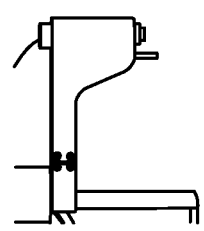
Figure 7B:
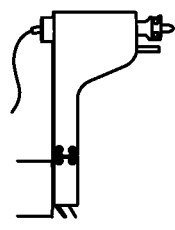
Figure 7D:
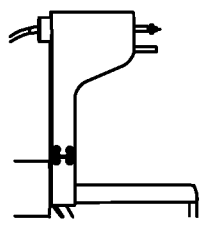
Figure 7F:
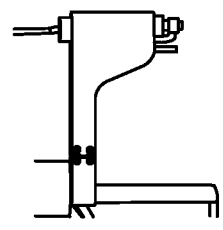

Additional examples of end effectors are shown in FIGS. 7A-7F. FIG. 7A demonstrates a foam cutting tool, FIG. 7B demonstrates a CNC/PCB milling end effector, FIG. 7C demonstrates an electronics pick and place assembly end effector, FIG. 7D demonstrates a screw fastening end effector, FIG. 7E demonstrates an FDM 3D printing head end effector, and FIG. 7F demonstrates a laser engraving head end effector. Other end effectors may be an HDK, an electronic screw driver, an electromagnet, a pen plotter, a suction cup with or without a fourth axis, a universal tool/housing, a laser engraver, a soldering iron with a solder feeder, a claw gripper with or without a fourth axis, a solderpaste dispenser, a glue dispenser, a liquid dispenser, a resin/SLA 3D printing tool, and a vinyl cutter.

Figure 19:
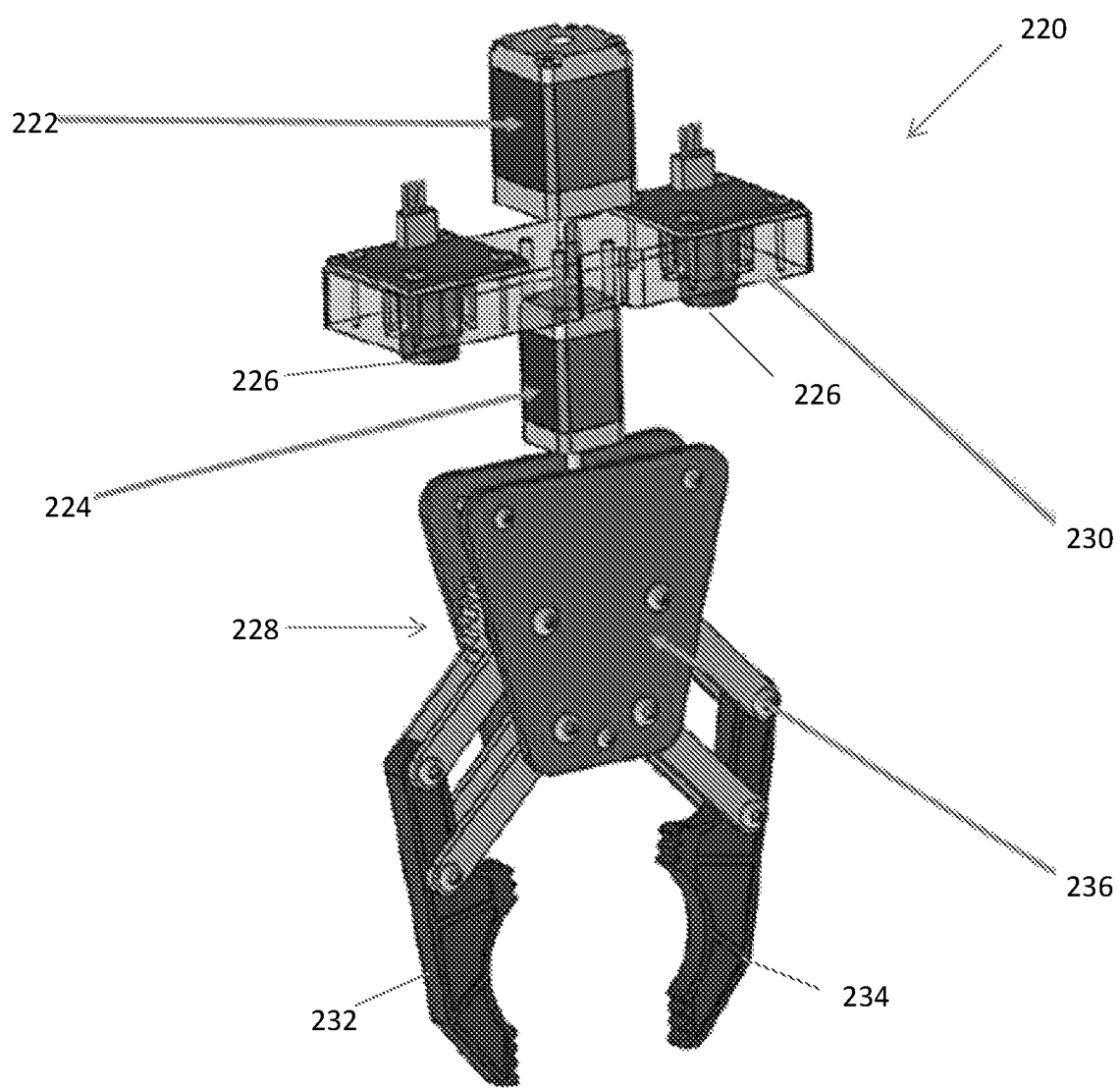
FIG. 19 is a perspective view of an exemplary embodiment of a dual function end effector.

The end effector can also have the capability of performing more than one function at a time, allowing a single end effector to perform multiple functions. In some embodiments, as illustrated in FIG. 19, a dual function end effector can be used that can grip objects and take photographs or video with the use of a camera. As shown in FIG. 19, an end effector 220 is in the form of a camera guided gripper that includes both visual guidance and gripping capabilities. The end effector 220 includes first and second motors 222, 224 that are used to drive one or more cameras 226 and a gripper 228, respectively. The first motor 222 is positioned proximal of a camera gantry 230 that is configured to house one or more cameras 226. Any number of cameras can be used, but in the illustrated embodiment the camera gantry 230 houses first and second cameras 226. The first motor 222 coupled to the camera gantry 230 is configured to maintain the position of the cameras 226 to the workspace to allow the cameras 226 to provide visual feedback to software to aid in the identification of pick and place locations and objects. The first motor 222 can be housed within the end effector 220. The second motor 224 is positioned distal of the camera gantry 230 and is configured to orient the grasp angle of the gripper 228. In some embodiments, the gripper 228 includes first and second jaws 232, 234 that are configured to pivot relative to the a gripper base 236 and each other in order to move towards one another to grip an object. It will be understood that any functionality can be used with a camera to allow for visualization when the device is performing various applications based on the end effector functionality coupled thereto. It will also be understood that there are various other combinations of end effector functions and applications that can be combined to create dual function end effectors.

Figure 20:
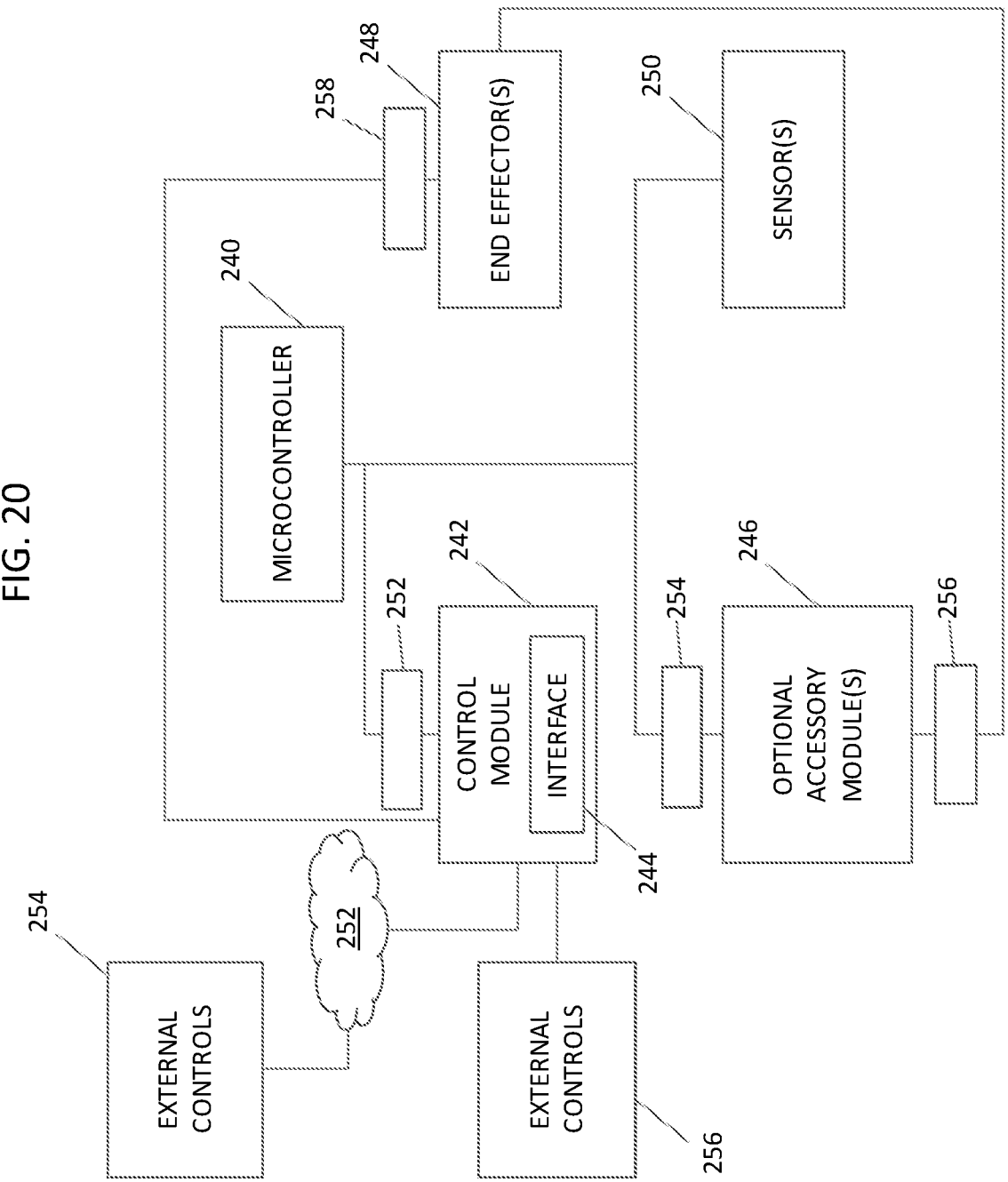
FIG. 20 is one of embodiment of a system architecture of a device of the present disclosure.

In some embodiments, a system architecture of the device 10 as shown in FIG. 20 is provided. As shown in FIG. 20, a microcontroller 240 is in communication with a control module 242, one or more optional accessory modules 246, one or more end effectors 248, and one or more sensors 250. The control module 242, the one or more optional accessory modules 246, and the one or more end effectors 248 each include one or more interfaces that allow the unified architecture of the device to electrically and mechanically couple the modules 242, 246 and the end effector 248 to one another and the device. The control module 242 includes an interface 252, and the one or more accessory modules 246 includes interfaces 254, 256 that allow the modules 242, 246 to removably couple to one another and the device electrically and/or mechanically, and the one or more end effectors 248 includes an interface 258 that allows the end effectors 248 to removably couple to the device and electrically and/or mechanically couple to the control module 242 and/or the accessory modules 246 and/or the device. The control module 242 can also include a user interface 244 that allows a user to interact with the control module 242 to control the function of the device. The control module 242 can also optionally communicate with components separate from the device, either using the internet or wifi connection 272 with external controls 274, or directly through a wired connection with external controls 276. The external controls 274, 276 can be any device or component capable of communicating with the control module 242, including a computing device. The one or more sensors 250 are in communication with the microcontroller 240 in order to provide feedback or control information to the microcontroller 240. For example, the one or more sensors 250 can include an autolevelling sensor such as the autolevelling sensor 212 shown in FIG. 18 that communicates information relating to surface height reading to the microcontroller 240. The one or more end effectors 248 are also in communication with the one or more accessory modules 246, mechanically and/or electrically, such that the accessory modules 246 can provide features that the end effectors 248 need to operate and perform their applications.

In some embodiments, a hardware development kit (HDK) is provided that allows a user to access the end effector mounting rail and power and control signals on the device. This allows a user to take a tool or sensor they wish to control in an automated or CNC process and leverage the control system and infrastructure of the device to do so. For example, a temperature reading of a bank of beakers may be automated consistently over a 24-hour period. The user may attach an IR thermometer to an unpopulated end effector interface. They can wire the thermometer's switch control to the tool head electrical contacts. The user would then use the software to program a temperature reading pattern.

The device can also optionally include safety features to prevent injury to the user. In one embodiment, the device can include a safety enclosure to prevent the injury of untrained operators. The enclosure can include emergency stops linked to the access panels handles. This may be used in STEM or education spaces to comply with on-site safety regulations. This allows the device to provide a complete learning experience to a user that includes programming the device to fabricating, automating, and testing without requiring the use of any additional devices or equipment.

Several other attachment schemes or methods can also be utilized such as spring loaded connectors to mate connectors automatically when the end effector is slid in within the opening in the arm. Other forms of connections may be Molex-style connectors or rectangular flexible battery contact style connectors. In additional embodiments, the end effector interface 17 may be compatible with custom or off the shelf tool changers for minimum user interaction.

Figure 9:
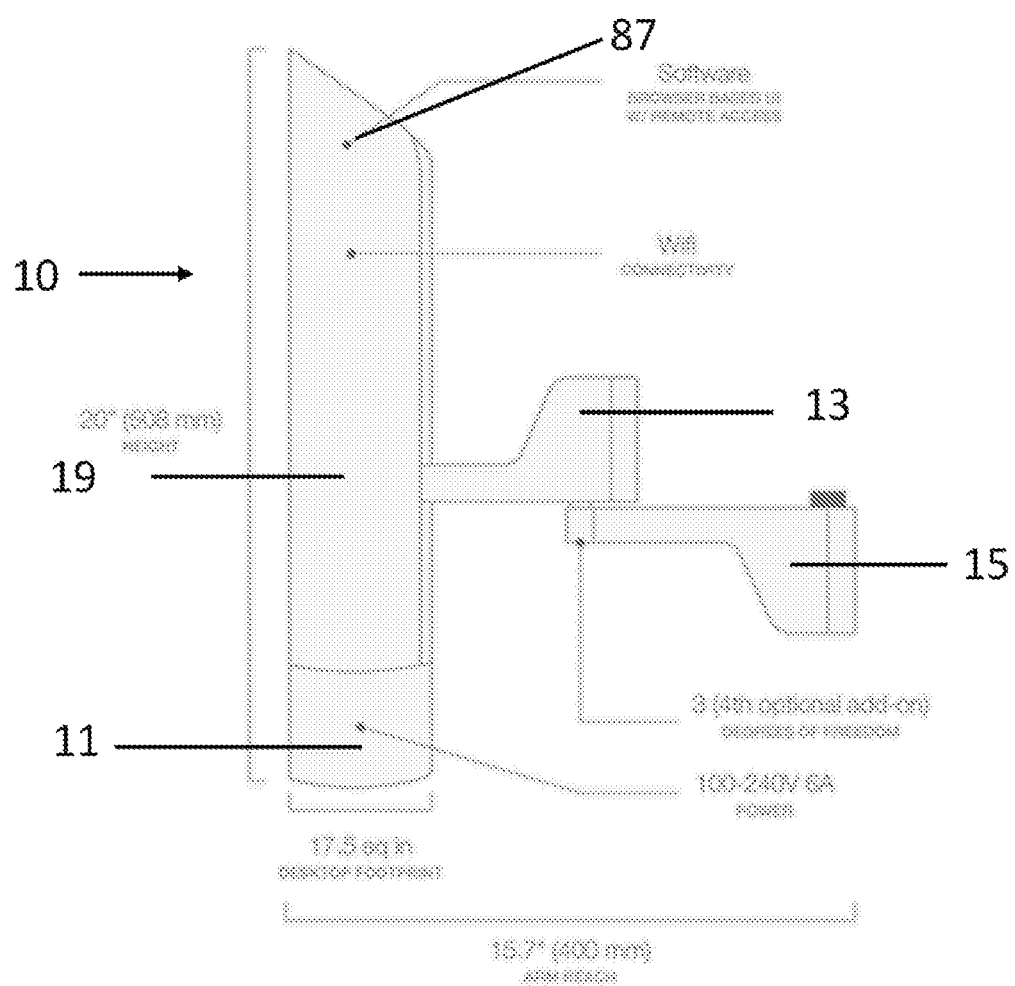
FIG. 9 is a side view of an embodiment of a device of the present disclosure.

Referencing FIG. 8 and FIG. 9, in some embodiments the device 10 comprises a software and user interface (UI) 80. The software for the device 10 may be in two parts, namely the user interface (UI) 80 running on any standard browser and a firmware 87 running on the device microcontroller/microprocessor. The UI 80 may be a cross-device/platform (device agnostic) browser based software running in any standard browser window 81 and connected to the device 10 over WiFi with an intermediary third party or self-hosted cloud based server. A 3D representation 82 of the device 10 and its workspace may be available in the UI 80 allowing a user to control and visualize a movement of the device 10 in 3D. In some embodiments, there may be a provision in a 3D workspace to 'drag and drop' or import 3D files or 2D designs for one click slicing and 3D printing or laser cutting, CNC milling etc. The UI 80 may show a type of end effector or tool head attached to the device 10 in a separate window 83 with tool head statistics such as, for example, a current temperature for the 3D printing head. There may be a separate window or console 84 for relaying Gcode/Machine code to the device 10. A control panel 85 may also be provided in the UI 80 to allow the user to move the device 10 in any of X, Y, Z axes or move either or both arms of the device separately with an angle input. In some embodiments, other options pertaining to the tool head or end effector attached to the second arm may also be available depending on an application the user chooses. In some embodiments, a sidebar 86 may also be present allowing the user to manage login/signup, account details, payments/subscriptions and other UI/software management functions. Connection/Wifi details and device serial/claim codes may also be entered or edited through this panel. In some embodiments, the firmware 87 running on the device 10 may have motion control logic to run one or more stepper motors running joints transmission, and may also run other real time software functions for the device 10 such as autolevelling calculations and end effector or tool head recognition. The firmware 87 may also communicate with the UI 80 via Wifi and cloud services to run preprogrammed functions and commands on the microcontroller/microprocessor through the control panel 85, buttons, geode/machine code console or other controls in the UI 80. The firmware 87 may also relay machine status and completion or progress of predefined events to the UI 80, which would in turn relay this information to the user via visual aids such as progress bars, graphs, text etc. In some embodiments, the firmware 87 may also carry out inverse kinematics and forward kinematics calculations to convert Cartesian coordinates (in the X, Y, Z space) to joint angles and vice versa to optimally control the device 10 according to the intended application. A software buffer in the firmware 87 may be utilized to store incoming Gcode/machine commands before running them to allow smooth operation of the device 10 without any delays. In some embodiments, application specific functions for 3D printing, CNC milling, or other effector applications may also be implemented within the firmware 87 to aid the user in running different fabrication tasks and processes. In some embodiments, the software/UI 80 comprises an intuitive, browser-based software/UI 80 adapted to automatically detect any end effector that is attached to the device 10.

All commands, functions and controls on the device 10 may be run through a program based on Gcode/Machine code, either through buttons, controls or through the gcode/machine code console in the UI 80. For example, the user may input machine code or Gcode into the UI console 80. The Gcode may be instructions to move one or more of the arms to a set of coordinates either in Cartesian (X, Y, Z) space or spherical space (angles of a first and second arm). Assuming the user wants an end effector to move to a fixed point X=100, y=100 on a workspace, this command is relayed to firmware 87 running on a microcontroller/microprocessor on the device 10 through Wifi. Upon receiving this command, the firmware 87 first checks to see what type of command has been relayed. If the command is a movement command, then an appropriate action is taken by the program and the coordinates are input into a function calculating inverse kinematics or forward kinematics depending on the type of coordinates input. An output of these calculations may be a number of steps needed to be moved by one or more stepper motors attached to one or more joints of each axis. The firmware 87 then relays the required steps to individual motors at these joints through motor drivers in an appropriate sequence. A similar sequence is followed for other such Gcode/machine code commands. An actual position of the arms is determined by absolute magnetic encoders (or any other forms of position sensing mechanisms) placed along a center axis of rotary joints of the first 13 and second 15 arms. An exact angular position of these joints is sensed by an encoder (or by any other medium) and relayed to the microcontroller/microprocessor which compares this position to an output value it sent to the motors to check that the arms 13, 15 have moved to the correct position. If a discrepancy is noted, corrective action is taken and the motors are moved to a required position. This closed loop feedback system ensures that the device always moves to the correct position input by the user.

In one embodiment, the workspace may be extended by use of a rail, carriage, wheeled base, tracked base or some other means of mobility that may expand the effective work area of the device. An application of this would be a manufacturing or automation application where the unit may be required to perform tasks in several locations of a facility. An additional application may be a unit that is constructing a 3d printed part that is larger than it nominal reach. In one embodiment the unit is able to account for the available work area that is installed into so that it may avoid interfering with any obstacles while it is performing its tasks.

Figure 21:
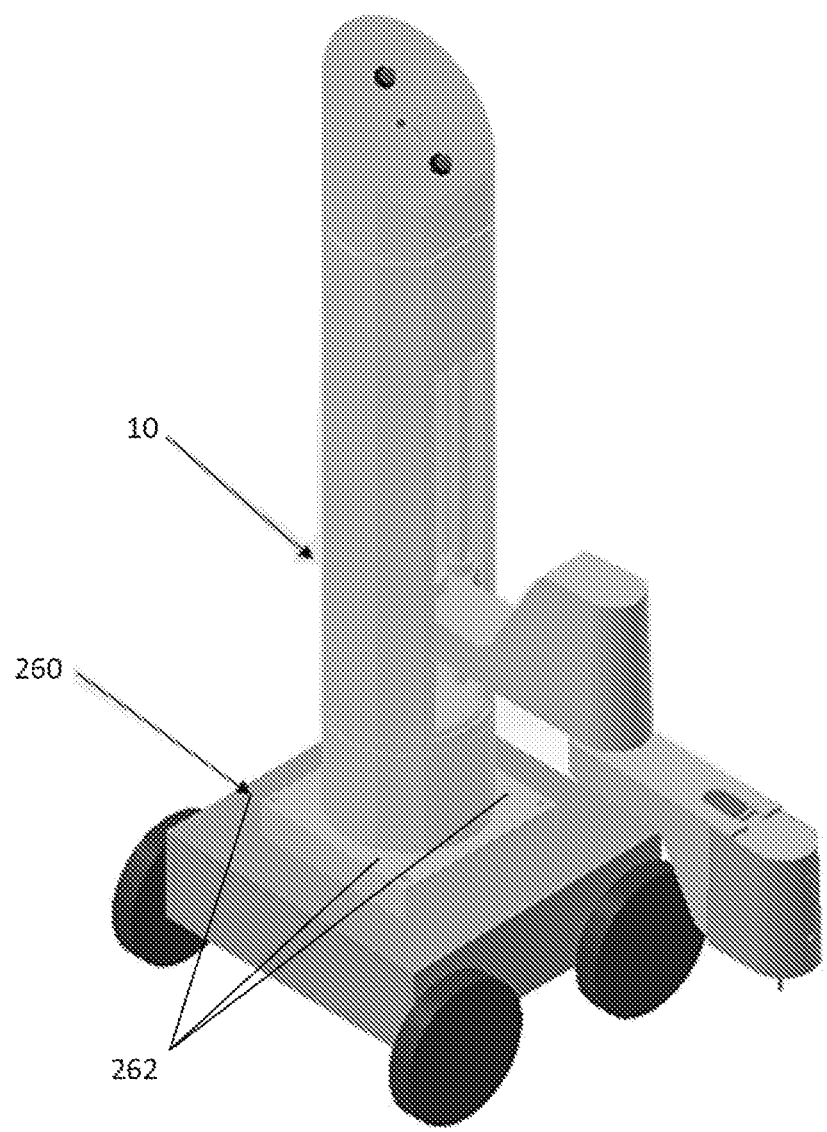
FIG. 21 is an image of mobility platform for moving a robotic arm according to some embodiments of the present disclosure.
Figure 22:
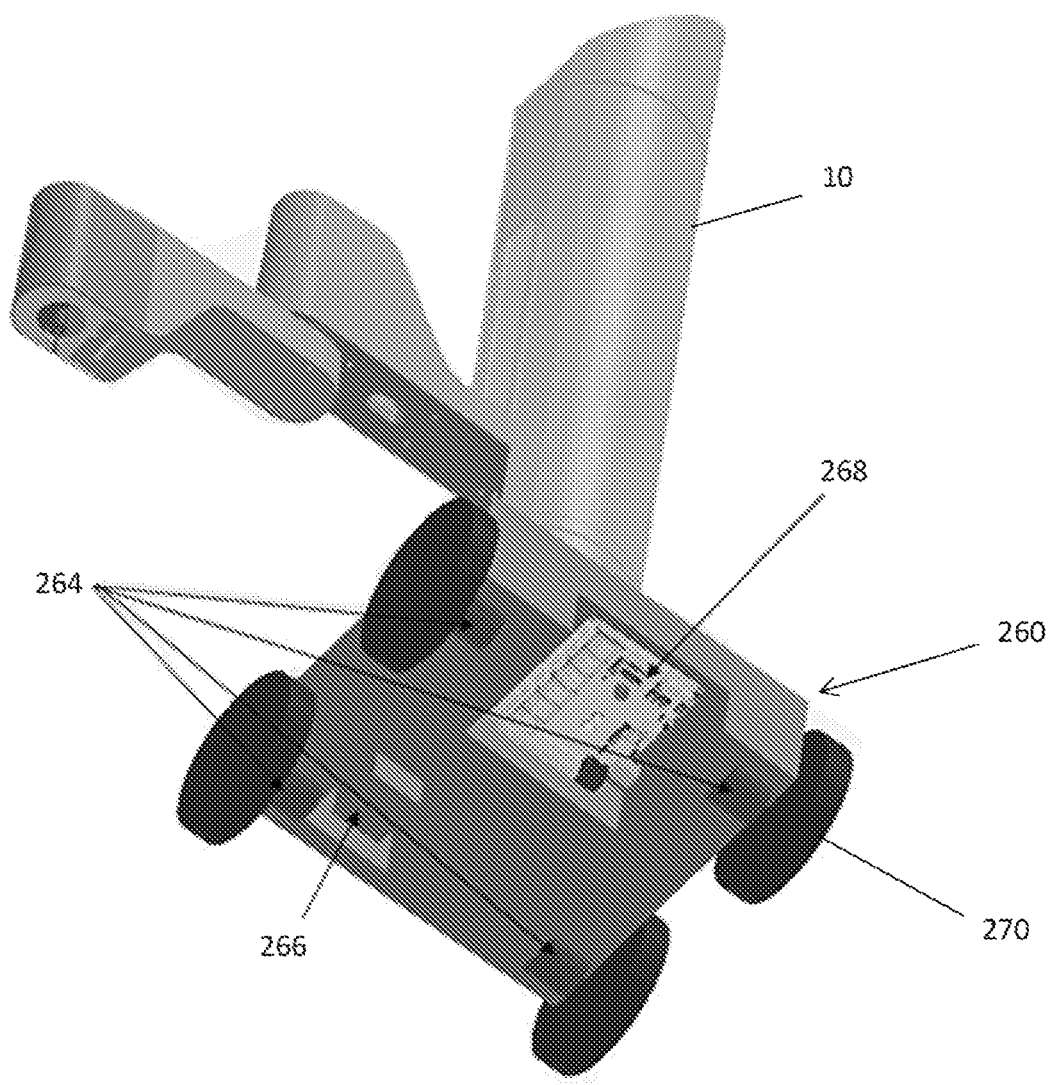
FIG. 22 is a bottom perspective view of the image of the mobility platform of FIG. 21.

In some embodiments, the device can include a mobility platform to extend the range of use of the device 10 such that the device can be moved in any direction for any desired distance. In some embodiments, a mobility platform 260, as shown in FIGS. 21-22, can comprises one or more attachment points 262 to removably couple the device 10 to the platform 260. There can be any number of attachment points 262, but in the illustrated embodiment there are four attachment points 262 to secure the device 10 to the platform. Although the illustrated embodiment secures the device 10 to the platform using screw and corresponding openings, it will be understood that any mechanism can be used as long as the device 10 can be removed from the platform 260 and that the device 10 is secure during movement of the platform 260. The mobility platform 260 also includes a power source to allow the platform 260 to move. In some embodiments, the power source is in the form of one or more batteries 266 along with a charging scheme. As shown in FIG. 22, the battery 266 can be positioned within a recess formed in the base of the platform 260, and can include charging features to charge the battery 266. The mobility platform 260 includes features to allow the platform 260 to move. In some embodiment, the platform 260 includes a plurality of wheels 270 positioned thereon that are connected to motors to allow for movement of the platform 260. Although the platform 260 can include any number of wheels 270, in the illustrated embodiment the platform 260 includes four wheels 270 with motors 264 and gearing attached. The platform 260 also includes features to control the various components and movement of the platform 260. In some embodiments, the platform 260 includes a controller 268 positioned on the base of the platform 260 and that can includes integrated wired and/or wireless communication. The controller also includes a motor controller for controlling the various motors 264, and one or more microcontrollers for communicating with various components, including the device 10 and one or more sensors of the platform 260. This controller can allow the platform 260 to follow routes mapped on a device, such as an external computing device, while providing feedback using one or more sensors positioned on the platform. The feedback can be used for a variety of purposes, including for obstacle avoidance and stability of the platform. The sensors can include but are not limited to a 9-axis, proximity, and other motion sensors that can be located on the control board. It will be understood that the sensors can be positioned anywhere on the mobility platform to provide feedback about the device and the platform, including the location of the device.

Figure 23:
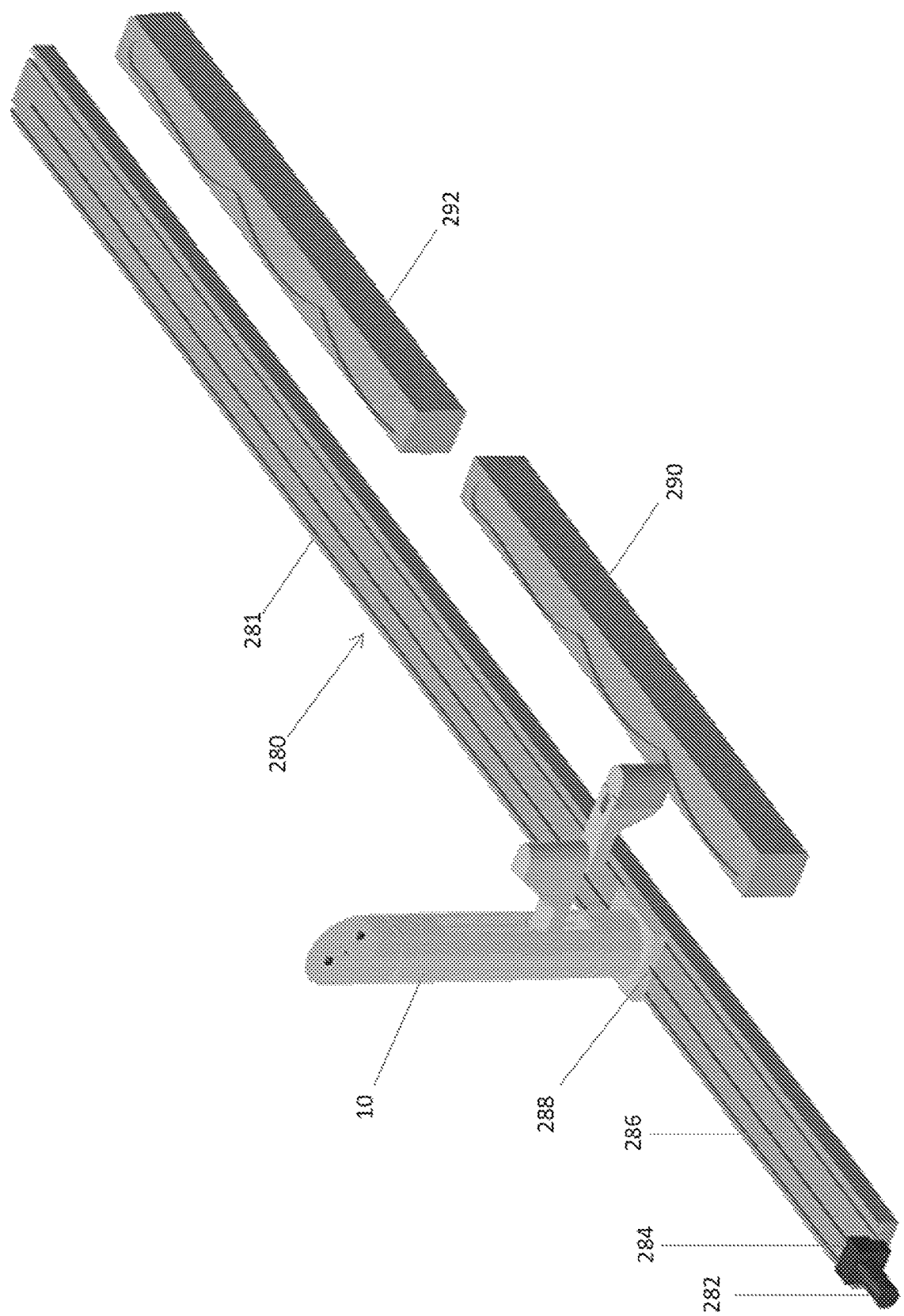
FIG. 23 is an image of a rail system for moving a robotic arm according to some embodiments of the present disclosure.

In some embodiments, the device 10 can be mounted to a system of one or more rails to provide mobility to the device 10 along the one or more rails. Referring to FIG. 23, a rail system 280 can include one or more rails such that the device 10 can be removably coupled thereto to allow the device 10 to slide along the rails to allow for mobility of the device 10. As shown, the rail system 280 includes a single rail 281 but any number of rails in any configuration can be used to move the device 10. In addition, although a single device 10 is shown positioned along the rail, it will be understood that any number of devices can be positioned along the rails to provide mobility to a number of devices to perform the same task at multiple locations with the same end effectors, or can provide various tasks a various locations along the rails with a variety of types of end effectors. The device can be removably and movably coupled to the rail 281 in a variety of ways, but in some embodiments the rail includes a lead screw 286 running along it length, and the device 10 includes a corresponding attachment point 288 that allows the device 10 to slide along the lead screw 286 of the rail 281. To provide movement of the device 10 along the rail 281, the rail system 280 includes a motor 282 and a controller 284 and communication module. The controller 284 is configured to drive the motor 282 which is coupled to the lead screw 286 to move the device 10 along the rail 281. In some embodiments, the controller 284 can be configured to receive commands wirelessly through Wi-Fi, Bluetooth, Zigbee, or similar wireless protocols. In some embodiments, the controller 284 can be attached via wires to a PC or the device, and be controlled through the wired connection thereto. The device 10 shown in FIG. 23 includes an end effector coupled thereto for CNC milling, and is shown working on first and second workpieces 290, 292 that are in the form of blocks of wood. As the device 10 is moved along the rail 281, the device 10 can work on first workpiece 290, and when that task is completed the controller 284 can be used to move the device 10 along the rail 281 to the second workpiece 292. It will be understood that any end effector can be used with the device 10 and the rail system, including but not limited to end effectors for 3D printing, soldering, pick and place, and any other task or application.

Figure 24:
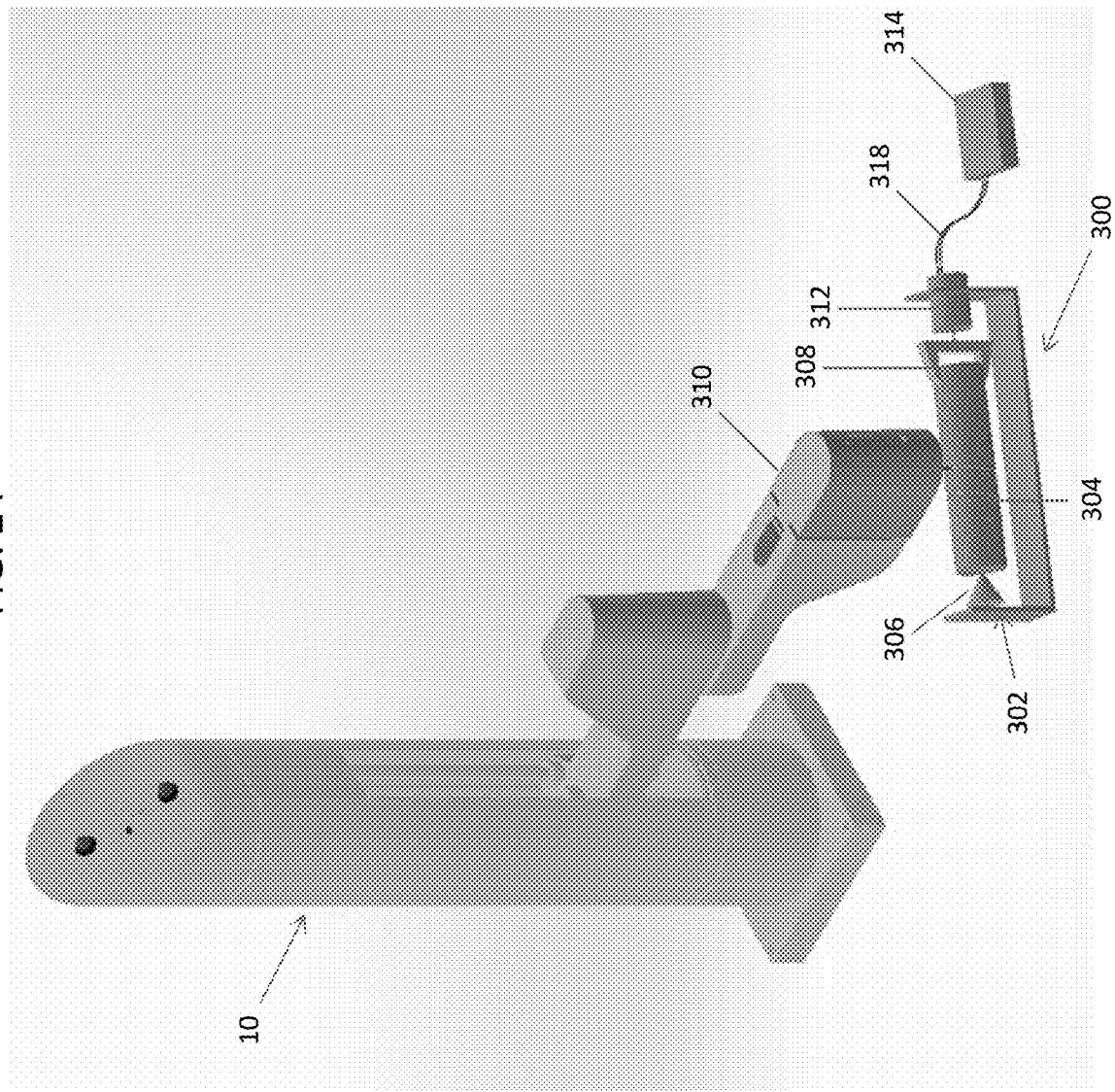
FIG. 24 is an image of an embodiment of a robotic arm according to some embodiments of the present disclosure in communication with an embodiment of a rotary tool.

The device 10 can also operate in conjunction with a variety of external components that facilitate the application of the end effectors coupled to the device 10. Referring to FIG. 24, in some embodiments a rotary tool 300 can be used with the device 10 such that the rotary tool 300 can rotate a workpiece being worked on by the end effector to allow for 3 or 4 axis application of the end effector. The material or work space/build platform being worked on can be rotated while the end effector is working on the material. This can be achieved in a variety of ways. In some embodiments, for example relating to CNC milling, the material being milled can be rotated. In some embodiments, for example relating to 3D printing, the work space or build plate can be rotated. For example, the 3D printing can be done on a round or curved build plate, although 4th axis printing can also be accomplished on a flat build plate. The rotary tool can also allow 3 axis fabrication by the rotation of the workpiece and/or build platform.

The rotary tool 300 can have a variety of configurations to hold a workpiece for use with an end effector on a device 10. In some embodiments, the rotary tool 300 is in the form of a bracket 302 that is configured to hold a workpiece 304 thereon. As shown in FIG. 24, the bracket 302 includes first and second clamping mechanisms 306, 308 positioned on opposite ends of the bracket 302 and that are configured to apply a force to first and second portions of the workpiece 304 to hold the workpiece 304 securely in the rotary tool 300. The rotary tool 300 can be positioned anywhere on a work surface or built platform relative to the device 10 as long as an end effector 310 can apply its functionality to the workpiece 304 positioned in the rotary tool 300. The rotary tool 300 also includes functionality to allow the rotary tool 300 to rotate the workpiece 304, such as a motor 312 that is positioned adjacent to and connected to the second clamping mechanism 308. A control module 314 is configured to control the operation of the rotary tool 300 such that the control module 314 is in communication with the device 10 and/or any other internal or external devices that can act in conjunction with the device 10 and/or the rotary tool 300. The control module 314 is also configured to couple to the rotary tool 300, either through a wired connection, such as with a wire 318, or through a wireless connection, to allow the control module 314 to control the motor 312 to affect the rotation of the rotary tool 300. The control module 314 can control the rotation in variety of ways, including the speed of rotation of the rotary tool 300 and the direction of rotation of the rotary tool 300. It will be understood that the rotary tool 300 can rotate at any speed, direction, and/or pattern to allow the end effector 310 of the device 10 to perform any task necessary to manipulate the workpiece 304 in any way. It will also be understood that, in some embodiments, the rotary tool 300 can used in conjunction with the mobility platform or the rail system as described above to further increase the functionality of the device 10.

The devices described herein can also be used for a variety of applications in addition to uses related to 3D printing and fabrication. In one embodiment, the device can be used for agricultural environmental analysis. The device may be left at a work site to take periodic readings or could be deployed for field use as needed, either with an automated base or carried manually. In another embodiment, the device can be used in a media or paint application for artistic or illustrative purposes. The device could draw from pigment reservoirs or extrude pigment from a supply line. In another embodiment, the device can be used for the custom dispensation of food items such as cake icing, pureed vegetables, chocolate and other consumables for cooking, baking or decorative purposes. In another embodiment, the device can be used in the building and crafting industry. One or more devices with one or more end effectors or tool heads can work together to create complex designs, for example, relating to mosaic tile floors and ceilings. In another embodiment, the device can be used as an ADA compliant assistant for users with disabilities. The adaptations for this use may include one-handed snap on and snap off tool heads and voice or EEG (electroencephalogram) commands. In another embodiment, the device can act as logistical and supply chain support by scanning bar codes and moving and stacking packages in a warehouse. In another embodiment, the device can be used as a retail or food service assistant, processing input from customers and carrying out the necessary pick and place, and checkout tasks as needed. In another embodiment, the device can be used for heavy outdoor use, including maintenance purposes. For example, a device that is battery operated or solar chargeable and cordless can be used to maintain and repair military vehicles in the field. In another embodiment, the device can be used as an inexpensive land and submersible on-site lab to gather and test materials and send out readings to a base computer. In another embodiment, the device can be used to create PC Boards from scratch by using the CNC tool head to lay down the tracks on a clean board and pick, place, and attach the electronic components to the board as required.

In yet another embodiment, the device can be used for various medical applications. In one embodiment, the device can be used for solution preparation using a solution generation tool head. Using the device, individual chemical solutions can be dispensed in a precise amount with a precise timing and mixed at a precise temperature. The consistency of lab results could improve if this system was automated. In another adaptation, the device can be used to test potentially contagious or hazardous materials at CDCs, hospitals, and research labs, removing the human element from these dangerous tasks and helping contain contagion and save lives. In another embodiment, the device can be used with a scanner or X-ray end effector or other wireless accessory that creates precise models of teeth or bones that can be 3D printed. Another adaptation could be for 3D prints of skin for grafting purposes or organs for transplant.

Examples

Repeatability Experiments.

Figure 10:
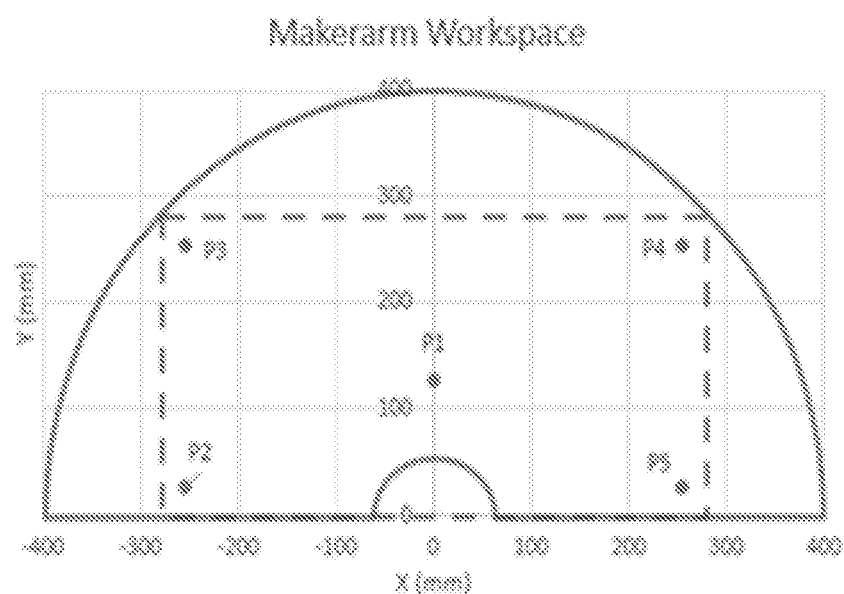
FIG. 10 is a graph of repeatability test points on a workspace of an embodiment of a device of the present disclosure.

Using harmonic drives for transmission, repeatability testing for a device was conducted according to ISO Standard EN ISO 9283. A precision digital micron dial gauge was used to take measurements at five different points in the workspace as illustrate below. A 1 kg payload was applied at the end effector to model actual load conditions. Repeated measurements taken over the entire work area were then used to calculate and plot best case and worst case repeatability figures for the prototype as shown in FIG. 10 and FIG. 11 and Table 2 below. Repeatability of the end effector positioning was experimentally determined to be 0.05 mm. This figure means that in positioning the end effector at a precise location of the workspace, a maximum error of 0.05 mm may occur.

Accuracy was also determined theoretically using mathematical calculations for this embodiment and came out to be 0.12 mm. This means that in moving from point A to B on the workspace, a maximum error of 0.12 mm may be occur. Payload weight of the end effector was determined using FEA analysis in CAD and also experimentally. This came out to be 5 Kgs for the maximum tolerable weight and 1 Kg nominal weight. This means that any end effector weighing up to 1 Kg may be used with the device. Over 5 Kgs the device may be damaged.

Figure 11A:
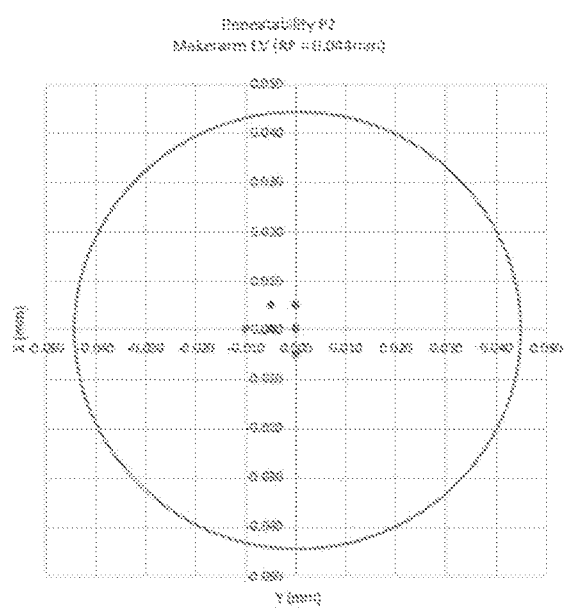
FIG. 11A and FIG. 11B depict best case and worst case repeatability plots for an embodiment of a device of the present disclosure.
Figure 11B:
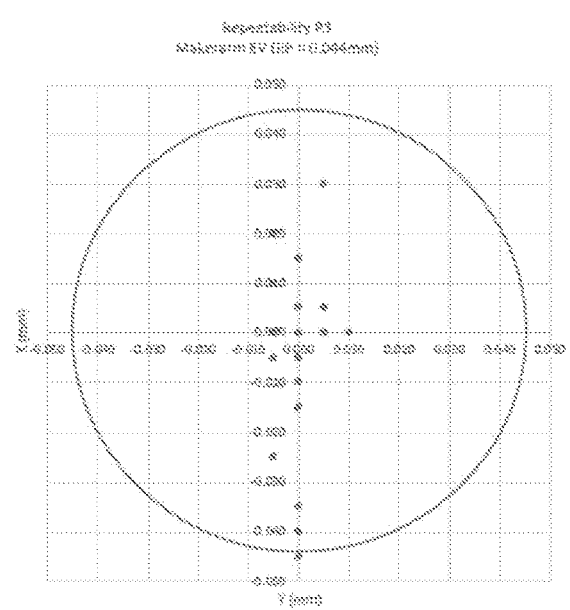

The arm has 3 moveable axes or 3 degrees of freedom. Positioning repeatability in some embodiments of the device was measured to be 0.05 mm or 0.044 mm. According to the ISO Standard EN ISO 9283 specification 5 points on the workspace of the device were chosen for the repeatability test. Then repeatability measurements were recorded with the aid of a micron dial gauge. The repeatability measurements or error/deviation from the target position and actual position are documented in FIG. 11A and FIG. 11B. FIG. 11A shows best case repeatability measurements while FIG. 11B shows worst case repeatability results. These measurements were taken while a payload of 1 kg was mounted at the end effector. Angular and linear resolutions were calculated to be as follows through theoretical means.

TABLE 2

| Final Results & Specifications | Value/Unit |
| --- | --- |
| Degrees of freedom | 3 ($4^{th}$ axis add-on) |
| Base footprint | 113 cm2 |
| Positioning repeatability | 0.044 mm |
| Payload | 1 kg |
| Degrees of rotation | 180 degrees |
| Workspace diameter | 800 mm |
| Angular resolution | 0.0167 degrees |
| Linear Resolution | 0.12 mm |

The present disclosure is directed to a digital assembly or fabrication device having a Selective Compliance Assembly Robotic Arm (SCARA) configuration with a plurality of robotic arms configured for multiple applications using interchangeable end effectors/toolheads. In some embodiments, a device comprising a tower covered by a shell, the tower having a base with a first axis of movement around a first joint, a first arm connected to the tower via a second joint along a second axis of movement, and a second arm connected to the first arm at a proximal end of the second arm via a third joint defining a third axis of movement. The second arm comprises an end effector interface at a distal end of the second arm, the end effector interface configured to hold a variety of end effectors usable for different applications, the end effectors being exchangeable allowing the device to perform digital fabrication and desktop manufacturing. The device further comprises an autolevelling function configured to sense a height of a work surface, and a training function allowing a user to teach either arm to perform or repeat specific actions and/or collaborate with another device to achieve a common assembly or fabrication task. In some embodiments, the device has a total footprint, the footprint being substantially smaller than a device workspace and allowing the device to be portable. In some embodiments, the first joint is a revolute joint, the second joint is a prismatic joint, and the third joint is a revolute joint.

In some embodiments, the autolevelling function comprises an electromechanical probe located at the distal end of the second arm, the probe configured to measure the height of the work surface at different points on the work surface, and configured to prepare a digital map of a slope or a contour of the surface.

In some embodiments, the end effectors/tool heads are capable of performing one or more functions, the one or more functions comprising fused deposition modeling (FDM), stereolithography (SLA), 3D printing, light duty computer numerical control (CNC) milling, laser engraving and cutting, pick and place, and basic assembly and digital fabrication operations.

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It can be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

What is claimed is:

1. A device comprising:
   a tower coupled to a base via a first joint, the first joint associated with a first axis of movement;
   a first arm coupled to the tower via a second joint, the second joint associated with a second axis of movement;
   a second arm coupled to the first arm via a third joint, the third joint associated with a third axis of movement;
   an end effector interface located on the second arm, the end effector interface including a mechanical connector and an electrical connector configured to couple interchangeably to each of multiple end effectors, the mechanical connector configured to retain an end effector coupled to the end effector interface and the electrical connector configured to supply power to the end effector and to enable data communication between the end effector and a controller coupled to the tower; and
   a supply line coupled to a module of the tower, coupled to the end effector, and separate from the first and second arms, the supply line configured to supply materials or vacuum to the end effector.

2. The device of claim 1, further comprising a module interface disposed on an upper surface of the tower, the module interface configured to removably couple to each of multiple modules, the each of the multiple modules configured to provide functionality to the end effector coupled to the end effector interface.

3. The device of claim 2, wherein the multiple modules comprise a control module configured to control the end effector.

4. The device of claim 2, wherein the module interface is configured to mechanically retain the module, to supply power to the module, and to enable data communication between the module and the controller coupled to the tower.

5. The device of claim 2, wherein the multiple modules comprise an accessory module coupled to the supply line.

6. The device of claim 5, wherein the accessory module includes a first module interface on a first surface and a second module interface on a second surface opposite the first surface, wherein the first module interface is configured to couple to the module interface disposed on the upper surface of the tower and the second module interface is configured to couple to a second module stacked on top of the accessory module, and wherein the first module interface is coupled to the second module interface via one or more pass-through data connections.

7. The device of claim 2, wherein the multiple modules are configured to be stacked on the module interface of the tower such that a control module is at a top of a stack of modules and one or more accessory modules are between the control module and the upper surface of the tower.

8. The device of claim 1, wherein the base is configured to be removably positioned on a work surface.

9. The device of claim 8, further comprising a probe communicatively coupled to the controller, wherein the probe is configured to send, to the controller, data indicative of relative heights of multiple locations on the work surface.

10. The device of claim 9, wherein the controller is configured to generate a digital map of a slope or a contour of the work surface based on the data from the probe.

11. The device of claim 1, wherein the first joint is a revolute joint, the second joint is a prismatic joint, and the third joint is a revolute joint.

12. The device of claim 1, further comprising a user interface (UE) configured to enable a training function allowing a user to: teach one of the first arm or the second arm to perform or repeat specific actions or collaborate with the other of the first arm or the second arm to achieve a common assembly or fabrication task.

13. A device comprising:
   a tower;
   an arm assembly connected to the tower via a joint, the arm assembly comprising an arm movable relative to the tower or comprising multiple arms moveable relative to one another and to the tower;
   an end effector interface located on the arm assembly, the end effector interface including a mechanical connector and an electrical connector configured to couple interchangeably to each of multiple end effectors, the mechanical connector configured to retain an end effector coupled to the end effector interface and the electrical connector configured to supply power and control signals to the end effector;
   a controller coupled to the tower and configured to generate the control signals to control the arm assembly and the end effector coupled to the end effector interface; and
   a probe coupled to the arm assembly and communicatively coupled to the controller, wherein the probe is configured to send, to the controller, height data indicative of relative heights of locations on a work surface, wherein the controller is configured to generate the control signals based on the height data.

14. The device of claim 13, further comprising a module interface disposed on an upper surface of the tower, the module interface configured to removably couple to each of multiple modules that are configured to provide functionality to the end effector coupled to the end effector interface.

15. The device of claim 14, wherein the multiple modules comprise a control module configured to control the end effector.

16. The device of claim 14, wherein the module interface is configured to mechanically retain a module coupled to the module interface, to supply power to the module, and to enable data communication between the module and the controller coupled to the tower.

17. The device of claim 14, wherein the multiple modules comprise an accessory module coupled via a supply line to the end effector coupled to the end effector interface and configured to supply materials or vacuum to the end effector via the supply line, the supply line distinct from the arm assembly.

18. The device of claim 14, wherein the multiple modules comprise an accessory module, wherein the accessory module includes a first module interface on a first surface and a second module interface on a second surface opposite the first surface, wherein the first module interface is configured to mechanically couple to the module interface disposed on the upper surface of the tower and the second module interface is configured to mechanically couple to a second module stacked on top of the accessory module, and wherein the first module interface and the second module interface are electrically coupled to one another to pass power and data between the tower and the second module.

19. The device of claim 14, wherein the multiple modules are configured to be stacked on the module interface of the tower such that a control module is at a top of a stack of modules and one or more accessory modules are between the control module and the upper surface of the tower.

20. The device of claim 13, wherein the controller is configured to generate a digital map of a slope or a contour of the work surface based on the height data from the probe and to generate the control signals based on the digital map.

* * * * *